United States Patent
Choi et al.

(10) Patent No.: US 12,525,186 B2
(45) Date of Patent: Jan. 13, 2026

(54) DISPLAY DEVICE AND DISPLAY PANEL

(71) Applicant: LG Display Co., Ltd., Seoul (KR)

(72) Inventors: Kwanghyun Choi, Paju-si (KR); SeungTae Jin, Paju-si (KR); Dongkyu Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/906,493

(22) Filed: Oct. 4, 2024

(65) Prior Publication Data

US 2025/0140187 A1 May 1, 2025

(30) Foreign Application Priority Data

Oct. 25, 2023 (KR) ........................ 10-2023-0144022

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/068* (2013.01)

(58) Field of Classification Search
CPC ....... H10K 59/00–95; G09G 2320/028; G09G 2320/068; G09G 2380/10; G09G 3/3233; G09G 2300/0452; G09G 3/32; G09G 3/3241; G02F 1/1323
See application file for complete search history.

(56) References Cited

U.S. PATENT DOCUMENTS

| 2011/0284881 | A1 | 11/2011 | Shikina et al. |
| 2012/0062135 | A1 | 3/2012 | Tamaki et al. |
| 2022/0399529 | A1* | 12/2022 | Shin ............ G09G 3/3275 |
| 2023/0217763 | A1* | 7/2023 | Hong ........... G09G 3/3258 |
| 2024/0178198 | A1* | 5/2024 | Ji ................ H10H 20/855 |

FOREIGN PATENT DOCUMENTS

| CN | 115831006 A | 3/2023 | |
| CN | 116437734 A | * 7/2023 | .......... G02B 3/0037 |
| JP | 2012-058639 A | 3/2012 | |
| KR | 10-2022-0165958 A | 12/2022 | |
| WO | 2011/145174 A1 | 11/2011 | |
| WO | 2022/058541 A1 | 3/2022 | |

OTHER PUBLICATIONS

Office Action issued on Oct. 2, 2025 for Japanese Patent Application No. 2024-178499 with English translation.

* cited by examiner

*Primary Examiner* — Sanjiv D. Patel
(74) *Attorney, Agent, or Firm* — Morgan, Lewis & Bockius LLP

(57) ABSTRACT

A display device may include a first narrow angle control line for being electrically connected to a first viewing angle control circuit, a first wide angle control line for being electrically connected to the first viewing angle control circuit, and a first subpixel for being electrically connected to the first viewing angle control circuit, thereby controlling the viewing angle of a specific area of the display panel.

22 Claims, 17 Drawing Sheets

DISPLAY DEVICE AND DISPLAY PANEL

CROSS-REFERENCE TO RELATED APPLICATIONS

This application claims the benefit of and priority to Korean Patent Application No. 10-2023-0144022, filed on Oct. 25, 2023, the entirety of which is incorporated herein by reference for all purposes as if fully set forth herein.

BACKGROUND

1. Technical Field

One or more example embodiments of the present disclosure relate to a display device and a display panel.

2. Description of the Related Art

As the information society develops, the demand for display devices for displaying images is increasing in various forms. In recent years, various display devices such as liquid crystal displays and organic light emitting display devices have been used.

An image can be displayed through a display panel, and the image can be displayed from the display panel with a predetermined viewing angle.

The image may be displayed as a wide angle or narrow angle depending on the viewing angle adjustment.

There may be technical problems of difficulty in freely adjusting the viewing angle of some areas of the display panel.

The description of the related art should not be assumed to be prior art merely because it is mentioned in or associated with this section. The description of the related art includes information that describes one or more aspects of the subject technology, and the description in this section does not limit the invention.

SUMMARY

One or more example embodiments of the present disclosure may provide a display device capable of controlling a viewing angle of a specific area of the display panel.

One or more example embodiments of the present disclosure may provide a display device whose viewing angles for the left, right, and up and down directions can be controlled simultaneously.

One or more example embodiments of the present disclosure may provide a display device capable of low power consumption through free viewing angle control.

One or more example embodiments of the present disclosure may provide a display device including a first viewing angle control circuit, a first narrow angle control line for being electrically connected to the first viewing angle control circuit, a first wide angle control line for being electrically connected to the first viewing angle control circuit, and a first subpixel for being electrically connected to the first viewing angle control circuit.

One or more example embodiments of the present disclosure may provide a display panel including a first pixel circuit for being electrically connected to a first narrow angle control line and a first wide angle control line, a second pixel circuit for being electrically connected to the first narrow angle control line and the first wide angle control line, and a third pixel circuit for being electrically connected to a second narrow angle control line and a second wide angle control line, wherein each of the second pixel circuit and the third pixel circuit is configured to emit light having a wide viewing angle, wherein the first pixel circuit is configured to emit light having a narrow viewing angle, and wherein the wide viewing angle is wider than the narrow viewing angle.

One or more example embodiments of the present disclosure may provide a display device including a first subpixel, and a first viewing angle control circuit connected to the first subpixel. The first subpixel may include a first light emitting device configured to emit light having a first viewing angle, and a second light emitting device configured to emit light having a second viewing angle that is different from the first viewing angle. The first viewing angle control circuit may be configured to selectively drive one of the first and second light emitting devices.

According to one or more example embodiments of the present disclosure, it is possible to provide a display device capable of controlling a viewing angle of a specific area of the display panel.

According to one or more example embodiments of the present disclosure, it is possible to provide a display device whose viewing angles for the left, right, and up and down directions can be controlled simultaneously.

According to one or more example embodiments of the present disclosure, it is possible to provide a display device capable of capable of low power consumption through free viewing angle control.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles and examples of the disclosure.

Figure 1:
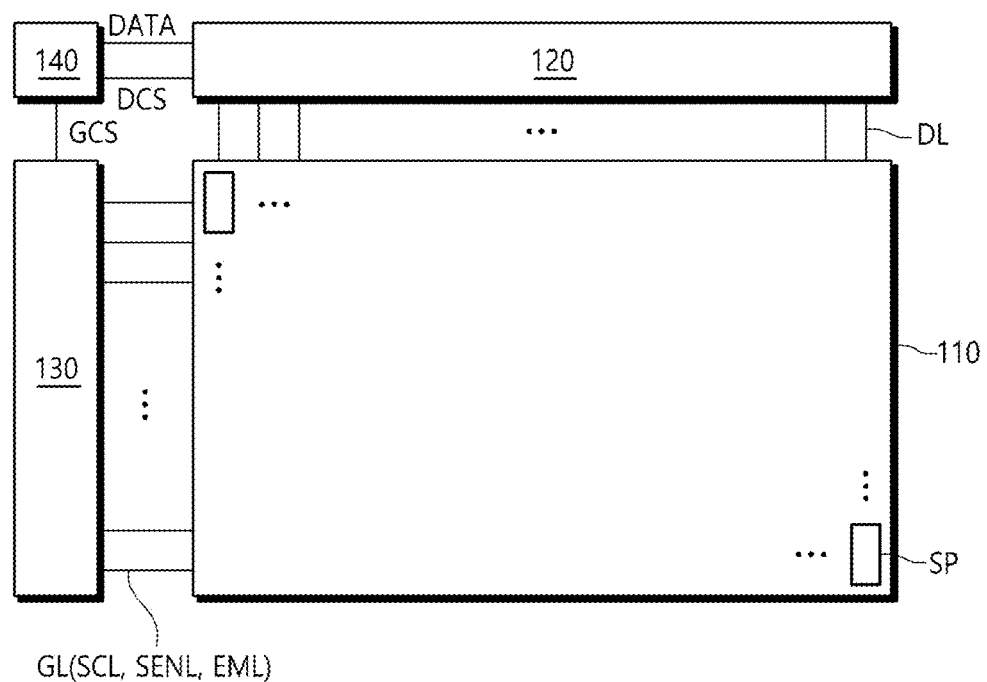
FIG. 1 illustrates a system configuration diagram of a display device according to one or more example embodiments of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

When a positional relationship between two elements (e.g., layers, films, regions, components, sections, members, parts, regions, areas, portions, and/or the like) are described using any of the terms such as "on," "on a top of," "upon," "on top of," "over," "under," "above," "upper," "below," "lower," "beneath," "near," "close to," "adjacent to," "beside," "next to," "at or on a side of," and/or the like indicating a position or location, one or more other elements may be located between the two elements unless a more limiting term, such as "immediate(ly)," "direct(ly)," or "close(ly)," is used. For example, when an element and another element are described using any of the foregoing terms, this description should be construed as including a case in which the elements contact each other directly as well as a case in which one or more additional elements are disposed or interposed therebetween. Furthermore, the spatially relative terms such as the foregoing terms as well as other terms such as "front," "rear," "back," "left," "right," "top," "bottom," "downward," "upward," "up," "down," "column," "row," "vertical," "horizontal," "diagonal," and the like refer to an arbitrary frame of reference. For example, these terms may be used for an example understanding of a relative relationship between elements, including any correlation as shown in the drawings. However, embodiments of the disclosure are not limited thereby or thereto. The spatially relative terms are to be understood as terms including different orientations of the elements in use or in operation in addition to the orientation depicted in the drawings or described herein. For example, where a lower element or an element positioned under another element is overturned, then the element may be termed as an upper element or an element positioned above another element. Thus, for example, the term "under" or "beneath" may encompass, in meaning, the term "above" or "over." An example term "below" or the like, can include all directions, including directions of "below," "above" and diagonal directions. Likewise, an example term "above," "on" or the like can include all directions, including directions of "above," "on," "below" and diagonal directions.

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., layers, films, regions, components, sections, members, parts, regions, areas, portions, steps, operations, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, member, part, region, area, portion, or the like) is "connected," "coupled," "attached," "adhered," "linked," or the like to another element, the element can not only be directly connected, coupled, attached, adhered, linked, or the like to another element, but also be indirectly connected, coupled, attached, adhered, linked, or the like to another element with one or more intervening elements disposed or interposed between the elements, unless otherwise specified.

For the expression that an element (e.g., layer, film, region, component, section, member, part, region, area, portion, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, member, part, region, area, portion, or the like) is "provided," "disposed," "connected," "coupled," or the like in, on, with or to another element may be understood, for example, as that at least a portion of the element is provided, disposed, connected, coupled, or the like in, on, with or to at least a portion of another element. The phrase "through" may be understood, for example, to be at least partially through or entirely through. The phrase that an element (e.g., layer, film, region, component, section, member, part, region, area, portion, or the like) "contacts," "overlaps," or the like with another element may be understood, for example, as that at least a portion of the element contacts, overlaps, or the like with a least a portion of another element.

The terms such as a "line" or "direction" should not be interpreted only based on a geometrical relationship in which the respective lines or directions are parallel, perpendicular, diagonal, or slanted with respect to each other, and may be meant as lines or directions having wider directivities within the range within which the components of the present disclosure may operate functionally. For example, the terms "first direction," "second direction," and the like (or the terms such as a row direction, a column direction, a left-right direction, and an up-down direction) should not be interpreted only based on a geometrical relationship in which the respective directions are parallel, perpendicular, diagonal, or slanted with respect to each other, and may be meant as directions having wider directivities within the range within which the components of the present disclosure may operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item. Further, at least one of a plurality of elements can represent (i) one element of the plurality of elements, (ii) some elements of the plurality of elements, or (iii) all elements of the plurality of elements.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, section, member, part, region, area, portion, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise. In one or more aspects, unless stated otherwise, the term "nth" may refer to "nnd" (e.g., 2nd where n is 2), or "nrd" (e.g., 3rd where n is 3), and n may be a natural number.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in more detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

FIG. 1 illustrates a system configuration diagram of a display device 100 according to one or more example embodiments of the present disclosure.

Referring to FIG. 1, a display device 100 according to one or more example embodiments of the present disclosure may include a display panel 110 in which a plurality of data lines DL and a plurality of gate lines GL are disposed and a plurality of subpixels SP connected to a plurality of data lines DL and the plurality of gate lines GL are disposed, and a driving circuit for driving the display panel 110.

According to the function, the driving circuit may include a data driving circuit 120 for driving a plurality of data lines DL, a gate driving circuit 130 for driving a plurality of gate lines GL, and a controller 140 for controlling the data driving circuit 120 and the gate driving circuit 130.

In the display panel 110, a plurality of data lines DL and a plurality of gate lines GL may be arranged to cross each other. For example, a plurality of e data lines DL may be arranged in rows or columns, and a plurality of gate lines GL may be arranged in columns or rows. Hereinafter, for convenience of explanation, it is assumed that the plurality of data lines DL are arranged in rows and the plurality of gate lines GL are arranged in columns.

The controller 140 may supply various control signals DCS and GCS required to drive operation of the data driving circuit 120 and the gate driving circuit 130, and may control the data driving circuit 120 and the gate driving circuit 130.

The controller 140 may start scanning according to the timing implemented in each frame, may convert the input image data input from the outside to fit the data signal format used in the data driving circuit 120 to output the converted image data DATA, and may control data operation at an appropriate time according to the scan.

The above-described controller 140 may receive various timing signals including a vertical synchronization signal Vsync, a horizontal synchronization signal Hsync, an input data enable (DE) signal, a clock signal CLK along with the input image data from the outside (e.g., host system).

The controller 140 may convert the input image data input from the outside to suit the data signal format used in the data drive circuit 120 and output the converted image data DATA, and may also, in order to control the data driving circuit 120 and the gate driving circuit 130, receive timing signals such as a vertical synchronization signal Vsync, a horizontal synchronization signal Hsync, an input DE signal, and a clock signal, and may generate various control signals and output to the data driving circuit 120 and the gate driving circuit 130.

The controller 140 may be a timing controller used in typical display technology, or a control device capable of performing other control functions including a timing controller.

The controller 140 may be implemented as a separate component from the data driving circuit 120, or may be integrated with the data driving circuit 120 and implemented as an integrated circuit.

The data driving circuit 120 may receive image data DATA from the controller 140 and supply a data voltage to the plurality of data lines DL, thereby driving the plurality of data lines DL. Here, the data driving circuit 120 may be also referred to as a source driving circuit.

The data driving circuit 120 may be implemented to include one or more source driver integrated circuits (SDIC). Each source driver integrated circuit SDIC may include a shift register, a latch circuit, a digital-to-analog converter, and an output buffer. Each source driver integrated circuit SDIC may, in some cases, further include an analog to digital converter ADC.

Each source driver integrated circuit SDIC may be connected to a bonding pad of the display panel 110 using a tape automated bonding (TAB) method or a chip-on-glass (COG) method or a chip-on-panel (COP) method. Alternatively, each source driver integrated circuit (SDIC) may be directly disposed on the display panel 110. Alternatively, each source driver integrated circuit SDIC may be integrated and disposed on the display panel 110. Alternatively, each source driver integrated circuit SDIC may be implemented in a chip on film (COF) method.

The gate driving circuit 130 may sequentially drive the plurality of gate lines GL by sequentially supplying scan signals to the plurality of gate lines GL. Here, the gate driving circuit 130 may be also called a scan driving circuit.

The gate driving circuit 130 may include a shift register, a level shifter, etc.

The gate driving circuit 130 may be connected to a bonding pad of the display panel 110 using a chip-on-glass (COG) method or a chip-on-panel (COP) method, or may be implemented as a gate-in-panel (GIP) type and placed directly on the display panel 110, or may be integrated and disposed on the display panel 110 in some cases. Alternatively, the gate driving circuit 130 may be implemented using a chip-on-film (COF) method in which a plurality of gate driver integrated circuits (G-DICs) are implemented and mounted on a gate-circuit film connected to the display panel 110.

The gate driving circuit 130 may sequentially supply scan signals of on-voltage or off-voltage to the plurality of gate lines GL under the control of the controller 140.

When a specific gate line is opened by the gate driving circuit 130, the data driving circuit 120 may convert the image data DATA received from the controller 140 into an analog data voltage to supply to a plurality of data lines DL.

The data driving circuit 120 may be located only on one side (e.g., upper or lower side) of the display panel 110, and in some cases, the data driving circuit 120 may be located on both sides (e.g., upper and lower sides) of the display panel 110 depending on the driving method, panel design method, etc.

The gate driving circuit 130 may be located only on one side (e.g., left or right side) of the display panel 110, and in some cases, the gate driving circuit 130 may be located on both sides (e.g., left and right sides) of the display panel 110 depending on the driving method, panel design method, etc.

The plurality of gate lines GL disposed on the display panel 110 may include a plurality of scan lines SCL, a plurality of sense lines SCL, and a plurality of emission control lines EML. The scan line SCL, the sense line SCL and the emission control line EML may be lines for transferring different types of gate signals (e.g., scan signal, sense signal, emission control signal) to a gate node of different types of transistors (e.g., scan transistor, sense transistor, emission control transistor). Hereinafter, it will be described with reference to FIG. 2.

The display device 100 according to the present embodiments may be a self-luminous display such as an organic light emitting diode (OLED) display, a quantum dot display, or a micro light emitting diode (Micro LED) display.

If the display device 100 according to the present embodiments is an OLED display, each subpixel SP may include an organic light emitting diode (OLED) which emits light as a light emitting device. If the display device 100 according to the present embodiments is a quantum dot display, each subpixel SP may include a light emitting device made of quantum dots, which are semiconductor crystals which emit light by itself. If the display device 100 according to the present embodiments is a micro LED display, each subpixel SP may include a micro LED, which emits light on its own and is made of inorganic materials, as a light emitting device.

Meanwhile, light emitted through the display panel 110 may be emitted from the display panel 110 at a predetermined viewing angle. One frame image may be displayed on the display panel 110 with each of the plurality of subpixels SP emitting light. When one subpixel SP emits light, the light may be emitted at a predetermined angle. For example, each of a plurality of subpixels SP may emit light in a predetermined viewing angle range, such as 30 degrees, 60 degrees, 120 degrees, or 150 degrees. In the case that the viewing angle is n degrees (n is a natural number greater than 1), the left side may be n/2 degrees and the right side may be n/2 degrees based on the front where the light is emitted. If the viewing angle is relatively large, it may be called "wide angle or wide viewing angle, wide viewing angle," and if the viewing angle is relatively small, it may be called "narrow angle or narrow viewing angle."

The viewing angle of the display panel 110 may be fixed. Alternatively, the viewing angle of the display panel 110 may be variable. For example, the viewing angle of the display panel 110 may be controlled through a light control film (LCF), a lens layer, or other viewing angle control structures.

As an example of one method for adjusting the viewing angle of the display panel 110, one subpixel SP may include two light emitting devices. The two light emitting devices may be a first light emitting device and a second light emitting device. The first light emitting device may be a light emitting device for narrow angle driving, and the second light emitting device may be a light emitting device for wide angle driving. As the first light emitting device and the second light emitting device are selectively driven, the frame image may be displayed on the display panel 110 at a narrow angle or wide angle.

In an example, the structure (e.g., an LCF, a lens layer, a viewing angle adjustment layer, or other viewing angle control structure) of a light emitting device configured to emit light having (or at) a wide viewing angle may be different from the structure of another light emitting device configured to emit light having (or at) a narrow viewing angle. In an example, the structure (e.g., an LCF, a lens layer, a viewing angle adjustment layer, or other viewing angle control structure) of a subpixel configured to emit light having (or at) a wide viewing angle may be different from the structure of another subpixel configured to emit light having (or at) a narrow viewing angle.

Hereinafter, it will be described a method of driving the display device 100 capable of being switched between narrow angle and wide angle in detail.

Figure 2:
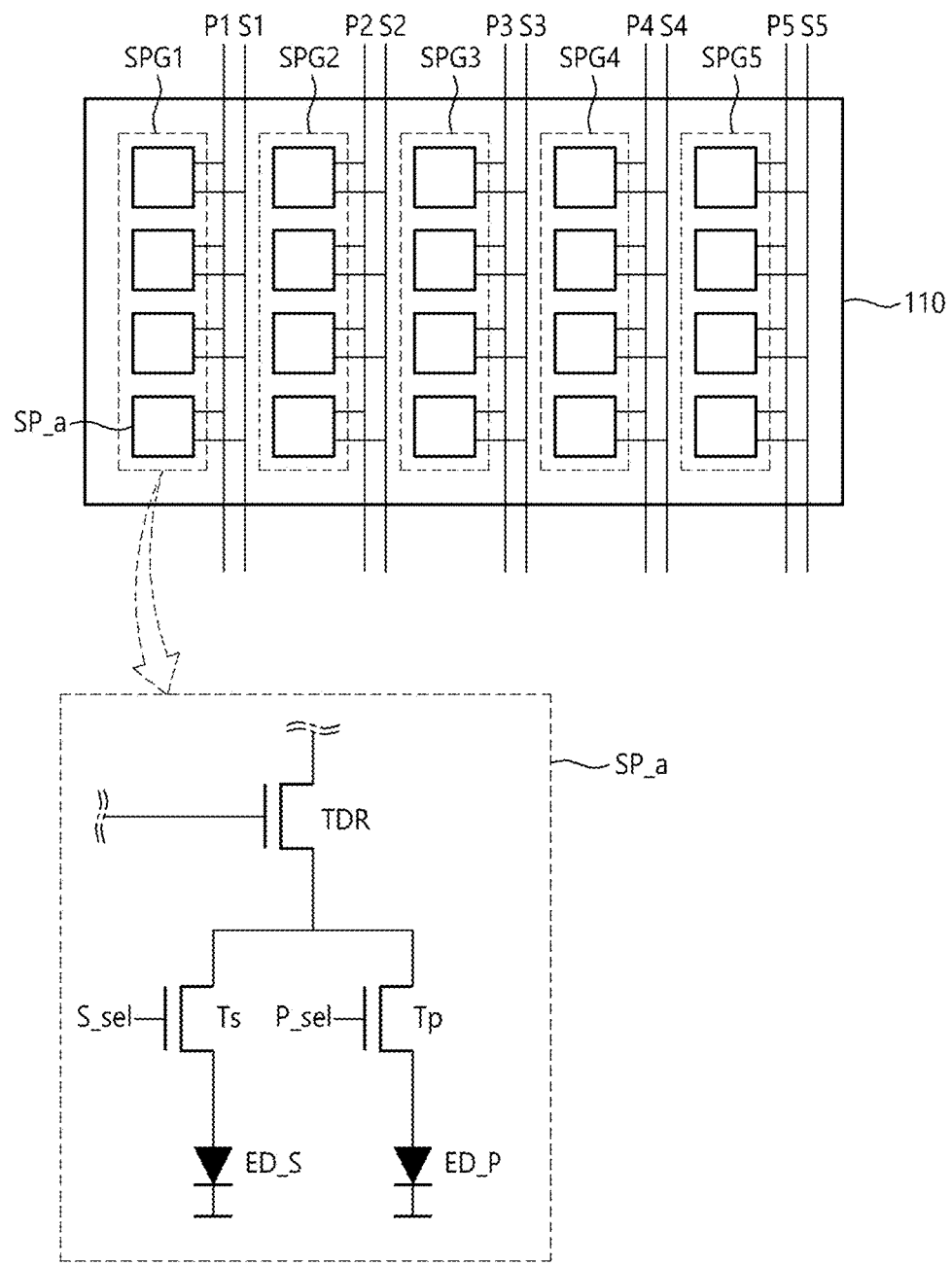
FIGS. 2, 3 and 4 illustrate a display panel including a plurality of subpixels emitting light at a narrow angle or a wide angle, or a portion of a display panel, according to one or more example embodiments of the present disclosure.
Figure 3:
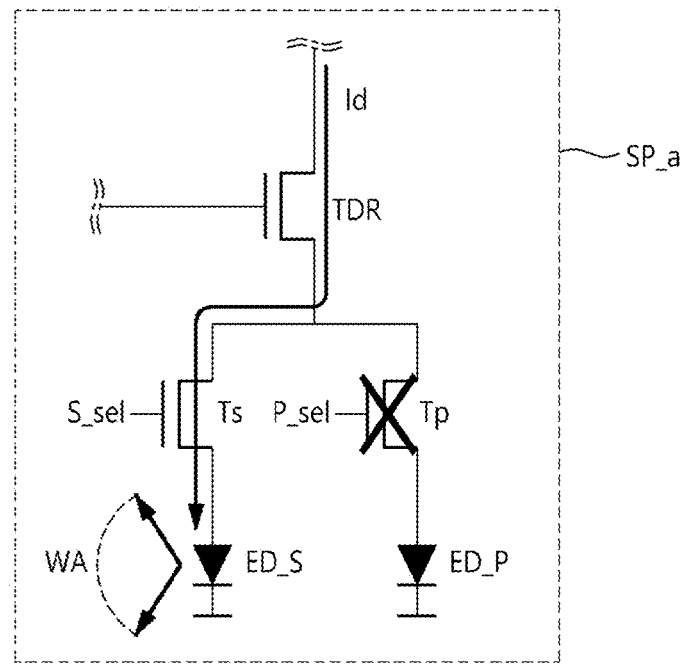
Figure 4:
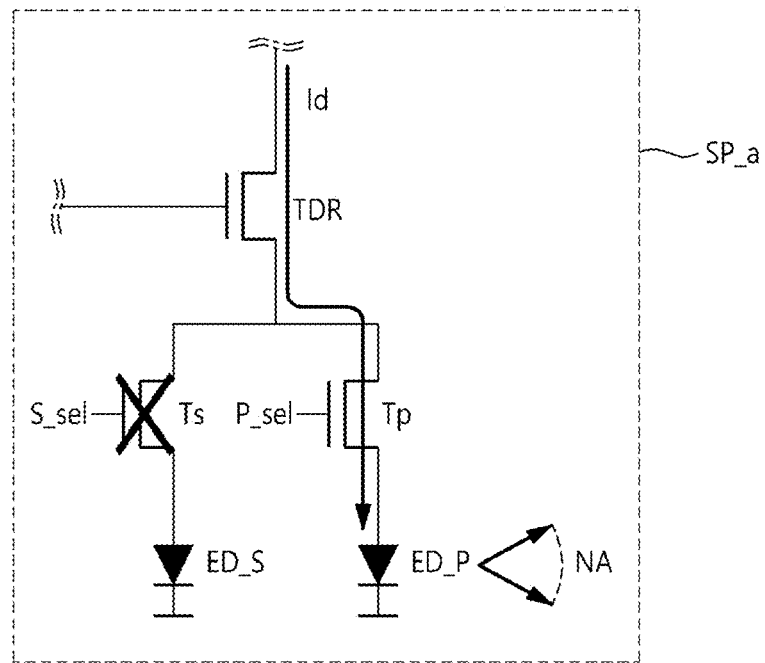

FIGS. 2, 3, and 4 are diagrams of a display panel 110 on which a plurality of subpixels emitting light at a narrow angle or wide angle are disposed according to one or more example embodiments of the present disclosure.

Referring to FIG. 2, there is illustrated a display panel 110 in which a plurality of subpixels are arranged.

The plurality of subpixels SP may be disposed in a matrix form.

The plurality of subpixels SP may be grouped in a column direction of the display panel 110. That is, the display panel 110 may include a plurality of subpixel groups SPGs.

Referring to FIG. 2, for convenience of explanation, it is assumed that 20 subpixels SP are disposed in the display panel 110. Five subpixel groups SPGs may be disposed on the display panel 110. Each subpixel group SPG may include four subpixels.

Referring to FIG. 2, a first subpixel group SPG1 may be disposed in the leftmost direction of the display panel 110, and a fifth subpixel group SPG5 may be disposed in the rightmost direction of the display panel 110. A second subpixel group SPG2, a third subpixel group SPG3 and a fourth subpixel group SPG4 may be disposed between the first subpixel group SPG1 and the fifth subpixel group SPG5.

The first subpixel group SPG1 may be electrically connected to a first narrow angle control line P1 and a first wide angle control line S1. The first narrow angle control line P1 and the first wide angle control line S1 may be electrically connected to subpixels included in the first subpixel group SPG1.

The second subpixel group SPG2 may be electrically connected to a second narrow angle control line P2 and a second wide angle control line S2. The second narrow angle control line P2 and the second wide angle control line S2 may be electrically connected to subpixels included in the second subpixel group SPG2.

The third subpixel group SPG3 may be electrically connected to a third narrow angle control line P3 and a third wide angle control line S3. The third narrow angle control line P3 and the third wide angle control line S3 may be electrically connected to subpixels included in the third subpixel group SPG3.

The fourth subpixel group SPG4 may be electrically connected to a fourth narrow angle control line P4 and a fourth wide angle control line S4. The fourth narrow angle control line P4 and the fourth wide angle control line S4 may be electrically connected to subpixels included in the fourth subpixel group SPG4.

The fifth subpixel group SPG5 may be electrically connected to a fifth narrow angle control line P5 and a fifth wide angle control line S5. The fifth narrow angle control line P5 and the fifth wide angle control line S5 may be electrically connected to subpixels included in the fifth subpixel group SPG5.

A plurality of subpixel groups SPG may emit light at a wide angle or narrow angle depending on a control signal supplied to the narrow angle control line P and the wide angle control line S.

Referring to FIG. 2, the subpixel group SPG is illustrated as being grouped in the column direction, but depending on the arrangement of the narrow angle control line P and the wide angle control line S, the subpixel group SPG may also be grouped in the row direction.

Each of the plurality of subpixels SP may include a plurality of transistors, a capacitor, and one or more light emitting devices, etc.

A plurality of subpixels SP may include one driving transistor TDR and one or more light emitting devices ED, and a plurality of subpixels SP may be configured in various ways, such as 2T1C, 3T1C, and 6T1C. The plurality of subpixels SP may be subpixels that do not require characteristic value compensation, or may be subpixels to which an internal compensation method is applied or subpixels to which an external compensation method is applied. That is, since the specific structure of the subpixel SP may be designed in various ways, the following description will focus on the driving transistor TDR and light emitting device ED included in the subpixel SP, and it may be omitted the description for other elements.

Referring to FIG. 2, there is illustrated a portion of the equivalent circuit of one subpixel SP_a included in the first subpixel group SPG1.

The subpixel SP_a may include a driving transistor TDR, a first emission control transistor Ts, a second emission control transistor Tp, a first light emitting device ED_S, and a second light emitting device ED_P.

Depending on the voltage supplied to a gate node of the driving transistor TDR, a driving current Id may flow through the driving transistor TDR. The driving current Id may be supplied to the first light emitting device ED_S or the second light emitting device ED_P. The first light emitting device ED_S and the second light emitting device ED_P may emit light with a luminance corresponding to the driving current Id.

The first emission control transistor Ts may be electrically connected between the driving transistor TDR and the first light emitting device ED_S. A gate node of the first emission control transistor Ts may be supplied with a wide angle control signal S_sel. According to the wide angle control signal S_sel, the first emission control transistor Ts may control the electrical connection relationship between the driving transistor TDR and the first light emitting device ED_S. The wide angle control signal S_sel may be a voltage with a specific magnitude, and may be expressed as a high level signal or a low level signal.

The second emission control transistor Tp may be electrically connected between the driving transistor TDR and the second light emitting device ED_P. A gate node of the second emission control transistor Tp may be supplied with a narrow angle control signal P_sel. The second emission control transistor Tp may control the electrical connection relationship between the driving transistor TDR and the second light emitting device ED_P according to the narrow angle control signal P_sel. The narrow angle control signal P_sel may be a voltage of a predetermined magnitude, and may be expressed as a high level signal or a low level signal.

Referring to FIG. 3, when the first emission control transistor Ts is turned on and the second emission control transistor Tp is turned off, the first light emitting device ED_S may be supplied with the driving current Id. When the first light emitting device ED_S emits light, the subpixel SP_a may emit light while maintaining the wide angle WA.

Referring to FIG. 4, when the second emission control transistor Tp is turned on and the first emission control transistor Ts is turned off, the second light emitting device ED_P may be supplied with the driving current Id. When the second light emitting device ED_P emits light, the subpixel SP_a may emit light while maintaining the narrow angle NA.

In the case that the subpixel SP_a emits light at a wide angle WA, the viewing angle may be wider than a case in which the subpixel SP_a emits light at a narrow angle NA. In this case, not only the user in front of the display panel 110 but also the user on the side of the display panel 110 can view the image displayed on the display panel 110. In case of the wide viewing angle, all users located within the wide viewing angle can view the image, so this can be called "sharing mode," "share mode," or "shared operation."

When the subpixel SP_a emits light at a narrow angle NA, the viewing angle may be narrower than when the subpixel SP_a emits light at a wide angle WA. In this case, only users in front of or close to the front of the display panel 110 can view the image displayed on the display panel 110. When the viewing angle is narrow, only users located within the narrow viewing angle can see the image, so this can be called "private mode," "privacy mode," or "privacy operation."

If the first light emitting device ED_S included in the subpixel SP emits light, the corresponding subpixel SP may be a subpixel SP disposed in a wide angle area SA. That is, the area of the display panel 110 where the first light emitting device ED_S emits light may be the wide angle area SA.

In the case that the second light emitting device ED_P included in the subpixel SP emits light, the corresponding subpixel SP may be a subpixel SP disposed in a narrow angle area PA. That is, the area of the display panel 110 where the second light emitting device ED_P emits light may be the narrow angle area PA.

In the case of the wide angle area SA, since the first light emitting device ED_S emits light at a wide viewing angle, an image may appear at a wide viewing angle in the wide angle area SA. Alternatively, the viewing angle may be adjusted through a light refractive structure such as a lens or a viewing angle adjustment layer disposed on the first light emitting device ED_S.

In the case of the narrow angle area PA, as the second light emitting device ED_P emits light at a narrow viewing angle, an image may appear at a narrow viewing angle in the narrow angle area PA. Alternatively, the viewing angle may be adjusted through a light refractive structure such as a lens or a viewing angle adjustment layer disposed on the second light emitting device ED_P.

Figure 5:
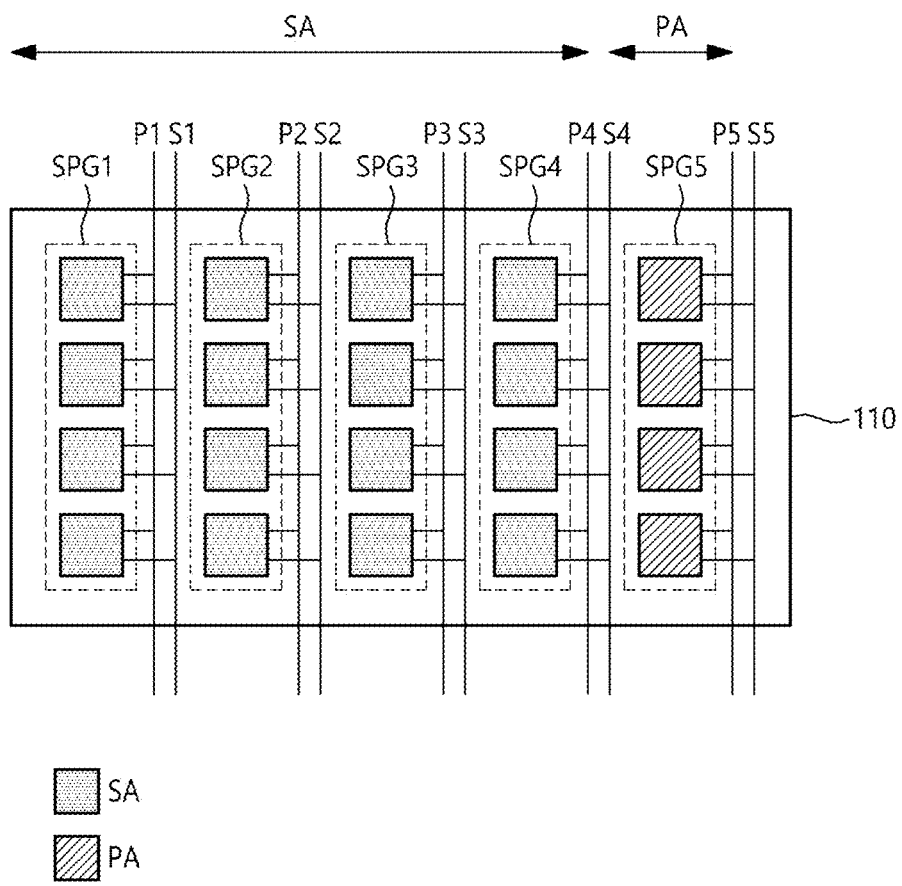
FIGS. 5 and 6 are example diagrams of a display panel including a wide angle area and a narrow angle area according to one or more example embodiments of the present disclosure.
Figure 6:
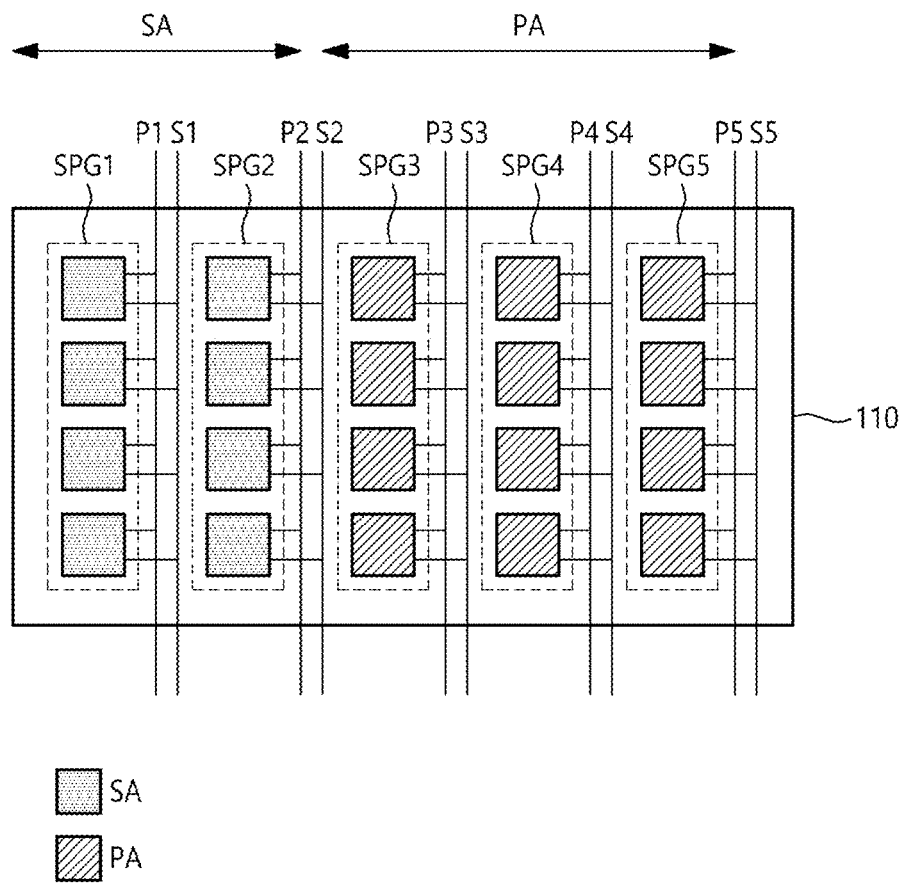

FIGS. 5 and 6 are example diagrams of the display panel 110 including a wide angle area SA and a narrow angle area PA according to one or more example embodiments of the present disclosure.

Figure 7:
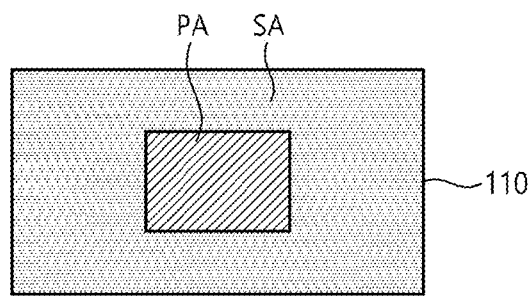
FIG. 7 is an example diagram of a display panel controlled by a local narrow angle area driving according to one or more example embodiments of the present disclosure.

FIG. 7 is an example diagram of the display panel 110 controlled by local narrow angle area driving according to one or more example embodiments of the present disclosure.

Referring to FIG. 5, a partial area of the display panel 110 may be a wide angle area SA, and the remaining area of the display panel 110 may be a narrow angle area PA. A first subpixel group SPG1, a second subpixel group SPG2, a third subpixel group SPG3, and a fourth subpixel group SPG4 may be disposed in the wide angle area SA of the display panel 110. A fifth subpixel group SPG5 may be disposed in the narrow angle area PA of the display panel 110. That is, the first to fourth subpixel groups SPG1 to SPG4 may emit light at a wide angle, and the fifth subpixel group SPG5 may emit light at a narrow angle.

Referring to FIG. 6, a partial area of the display panel 110 may be a wide angle area SA, and the remaining area of the display panel 110 may be a narrow angle area PA. A first subpixel group SPG1 and a second subpixel group SPG2 may be disposed in the wide angle area SA of the display panel 110. A third subpixel group SPG3, a fourth subpixel group SPG4, and a fifth subpixel group SPG5 may be disposed in the narrow angle area PA of the display panel 110. That is, the first subpixel group SPG1 and the second subpixel group SPG2 may emit light at a wide angle, and the third subpixel group SPG3 to the fifth subpixel group SPG5 may emit light at a narrow angle.

Referring to FIGS. 5 and 6, a narrow angle control line P and a wide angle control line S may be arranged in the column direction of the display panel 110, and the narrow angle control line P and the wide angle control line S may be electrically connected to the plurality of subpixel groups SPGs.

Since the narrow angle control line P and the wide angle control line S arranged in the column direction are electrically connected to the subpixel group SPG grouped in the column direction, the wide angle area SA or narrow angle area PA may only be controlled in the column direction. For example, the left area, which is a partial area of the display panel 110, may be a narrow angle area PA, and the right area, which is the remaining area of the display panel 110, may be a wide angle area SA. For convenience of explanation, the column direction is used as an example, but the row direction may also be used. That is, the narrow angle area PA or the wide angle area SA of the display panel 110 may be controlled only in either the left-right direction or up-down direction.

Referring to FIG. 7, there is illustrated that the display panel 110 has viewing angles in the left-right directions and up-down directions controlled simultaneously. Referring to FIG. 7, there is illustrated an example in which a central area of the display panel 110 is a narrow angle area PA, and the remaining area of the display panel 110 is a wide angle area SA. Simultaneous control of the viewing angles in the left-right directions and up-down directions may be referred to as a "local SPM," "local viewing angle control," or "local viewing angle mode."

That is, one or more example embodiments of the present disclosure may provide a display device capable of controlling the viewing angle of a specific area of the display panel.

One or more example embodiments of the present disclosure may provide a display device capable of simultaneously controlling the viewing angles in the left-right and up-down directions.

One or more example embodiments of the present disclosure may provide a display device capable of low power consumption through free viewing angle control. Hereinafter, this will be explained in detail.

Figure 8:
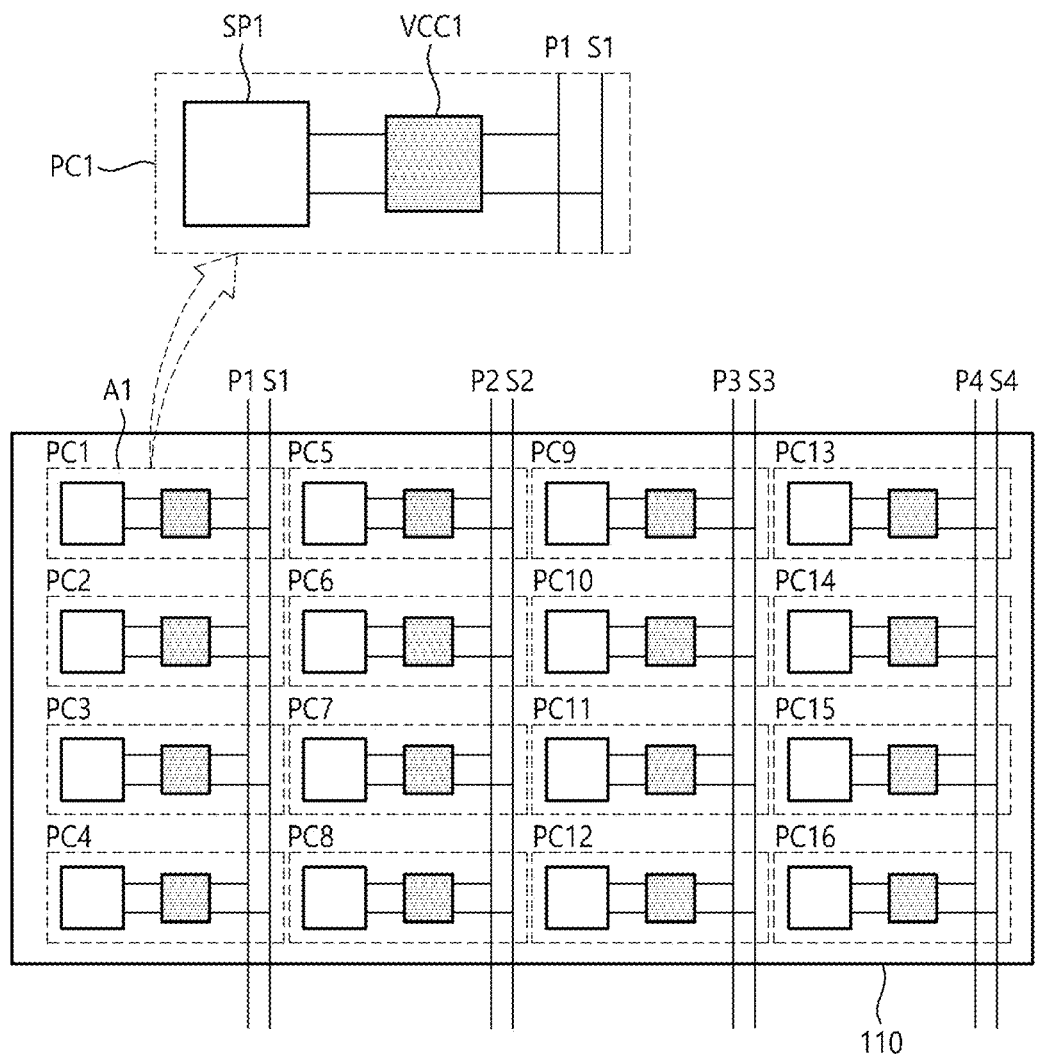
FIG. 8 is a diagram of a display panel including a plurality of pixel circuits according to one or more example embodiments of the present disclosure.

FIG. 8 illustrates a display panel 110 including a plurality of pixel circuits PCs according to one or more example embodiments of the present disclosure.

Referring to FIG. 8, the display panel 110 may include a plurality of pixel circuits PC, a plurality of narrow angle control lines P, and a plurality of wide angle control lines S.

Referring to FIG. 8, there is illustrated a display panel 110 on which sixteen pixel circuits PC, four narrow angle control lines P, and four wide angle control lines S are disposed. The number of pixel circuits PC, narrow angle control lines P and wide angle control lines S is not limited thereto.

One narrow angle control line P and one wide angle control line S may be electrically connected to a plurality of pixel circuits PC.

Referring to FIG. 8, a first narrow angle control line P1 may be electrically connected to a first pixel circuit PC1, a second pixel circuit PC2, a third pixel circuit PC3, and a fourth pixel circuit PC4.

Referring to FIG. 8, a first wide angle control line S1 may be electrically connected to the first pixel circuit PC1, the second pixel circuit PC2, the third pixel circuit PC3, and the fourth pixel circuit PC4.

Referring to FIG. 8, a second narrow angle control line P2 may be electrically connected to a fifth pixel circuit PC5, a sixth pixel circuit PC6, a seventh pixel circuit PC7, and an eighth pixel circuit PC8.

Referring to FIG. 8, a second wide angle control line S2 may be electrically connected to the fifth pixel circuit PC5, the sixth pixel circuit PC6, the seventh pixel circuit PC7, and the eighth pixel circuit PC8.

Referring to FIG. 8, a third narrow angle control line P3 may be electrically connected to a ninth pixel circuit PC9, a tenth pixel circuit PC10, an eleventh pixel circuit PC11, and a twelfth pixel circuit PC12.

Referring to FIG. 8, a third wide angle control line S3 may be electrically connected to a ninth pixel circuit PC9, a tenth pixel circuit PC10, an eleventh pixel circuit PC11, and a twelfth pixel circuit PC12.

Referring to FIG. 8, a fourth narrow angle control line P4) may be electrically connected to a thirteenth pixel circuit PC13, a fourteenth pixel circuit PC14, a fifteenth pixel circuit PC15, and a sixteenth pixel circuit PC16.

Referring to FIG. 8, a fourth wide angle control line S4 may be electrically connected to a thirteenth pixel circuit PC13, a fourteenth pixel circuit PC14, a fifteenth pixel circuit PC15, and a sixteenth pixel circuit PC16.

A plurality of pixel circuits PC may include one or more subpixels SP and one viewing angle control circuit VCC.

Referring to FIG. 8, each of the plurality of pixel circuits PC may include one subpixel SP and one viewing angle control circuit VCC.

Referring to FIG. 8, there is illustrated a first pixel circuit PC1 disposed in the first area.

The first pixel circuit PC1 may include a first subpixel SP1 and a first viewing angle control circuit VCC1.

The first viewing angle control circuit VCC1 may be electrically connected to the first subpixel SP1.

Referring to FIG. 8, the first viewing angle control circuit VCC1 may be electrically connected to a first narrow angle control line P1 and a first wide angle control line S1.

The first viewing angle control circuit VCC1 may control a viewing angle of light emitted from the first subpixel SP1 based on signals supplied through the first narrow angle control line P1 and the first wide angle control line S1.

The characteristics of the subpixel SP and the viewing angle control circuit VCC included in the remaining pixel circuits PC except for the first pixel circuit PC1 may be similar to those of the first sub pixel circuit PC1. The characteristics may be the same as those of the pixel SP1 and the first viewing angle control circuit VCC1. Therefore, hereinafter, the detailed operation of the plurality of pixel circuits PC will be described using the first pixel circuit PC1 as an example.

Figure 9:
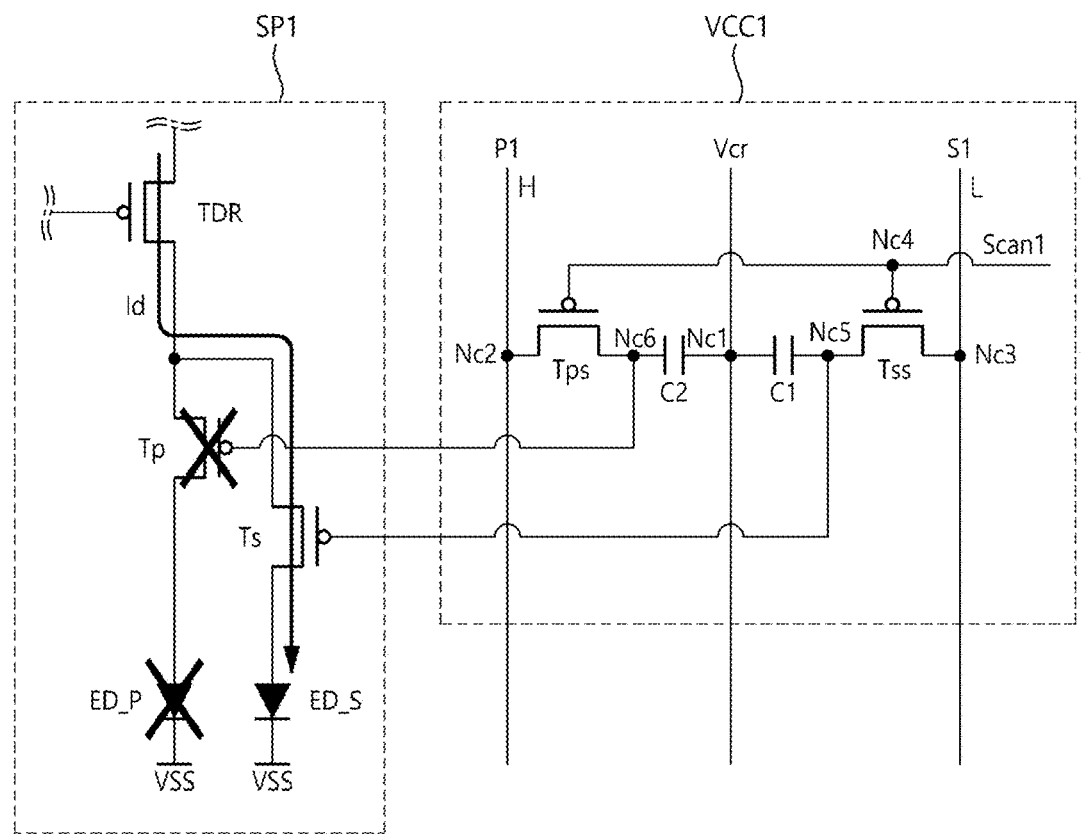
FIGS. 9 and 10 are diagrams of a partial configuration of a subpixel and a viewing angle control circuit according to one or more example embodiments of the present disclosure.
Figure 10:
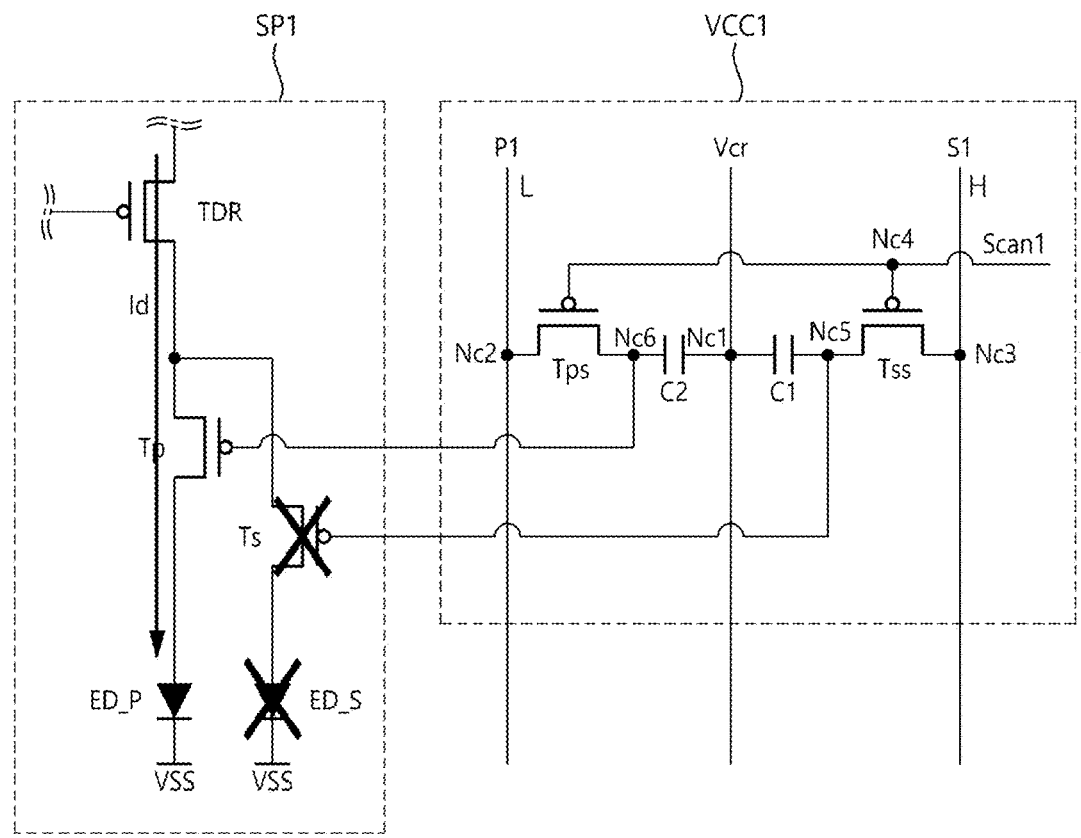

FIGS. 9 and 10 illustrate some configurations of the subpixel SP and the viewing angle control circuit VCC according to one or more example embodiments of the present disclosure.

Referring to FIGS. 9 and 10, there is illustrated a partial configuration of the first subpixel SP1 and the first viewing angle control circuit VCC1 included in the first pixel circuit PC1. The transistors shown in FIGS. 9 and 10 are shown as P-type, but are not limited thereto, and may only be configured as N-type. Alternatively, both a P-type transistor and an N-type transistor may be included.

The first subpixel SP1 may include a plurality of transistors, capacitors, two or more light emitting devices, etc. The first subpixel SP1 may be designed in various ways, such as 2T1C, 3T1C, and 6T1C. Since the specific structure of the first subpixel SP1 is designed in various ways, the following description will focus on the driving transistor TDR and light emitting device ED included in the subpixel SP, and it may be omitted the description for other elements.

Referring to FIGS. 9 and 10, the first subpixel SP1 includes a driving transistor TDR, a first emission control transistor Ts, a second emission control transistor Tp, and a first light emitting device ED_S, and a second light emitting device ED_P.

Depending on the voltage supplied to a gate node of the driving transistor TDR, the driving current Id may flow through the driving transistor TDR. The driving current Id may be supplied to the first light emitting device ED_S or the second light emitting device ED_P. The first light emitting device ED_S and the second light emitting device ED_P may emit light with a luminance corresponding to the driving current Id.

The first emission control transistor Ts may be electrically connected between the driving transistor TDR and the first light emitting device ED_S. A gate node of the first emission control transistor Ts may be supplied with a wide angle control signal S_sel. According to the wide angle control signal S_sel, the first emission control transistor Ts may control the electrical connection relationship between the driving transistor TDR and the first light emitting device ED_S.

The first light emitting device ED_S may be electrically connected between the first emission control transistor Ts and a node supplied with a base voltage VSS.

The second emission control transistor Tp may be electrically connected between the driving transistor TDR and the second light emitting device ED_P. A gate node of the second emission control transistor Tp may be supplied with a narrow angle control signal P_sel. The second emission control transistor Tp may control the electrical connection relationship between the driving transistor TDR and the second light emitting device ED_P according to the narrow angle control signal P_sel.

The second light emitting device ED_P may be electrically connected between the second emission control transistor Tp and the node supplied with the base voltage VSS.

The first viewing angle control circuit VCC1 may be electrically connected to the first subpixel SP1, the first wide angle control line S1, and the first narrow angle control line P1. The first viewing angle control circuit VCC1 may control the viewing angle of light emitted from the first subpixel SP1 based on signals supplied from the first wide angle control line S1 and the first narrow angle control line P1.

The first viewing angle control circuit VCC1 may include a first viewing angle control transistor Tss, a second viewing angle control transistor Tps, a first control capacitor C1, and a second control capacitor C2.

The first viewing angle control transistor Tss may be electrically connected between a fifth connection node Nc5 and a third connection node Nc3. The first viewing angle control transistor Tss may be electrically connected to the first wide angle control line S1 through the third connection node Nc3. A gate node of the first viewing angle control transistor Tss may be electrically connected to a fourth connection node Nc4. The gate node of the first viewing angle control transistor Tss may receive a first scan signal Scan1.

The second viewing angle control transistor Tps may be electrically connected between a sixth connection node Nc6 and a second connection node Nc2. The second viewing angle control transistor Tps may be electrically connected to the first narrow angle control line P1 through the second connection node Nc2. A gate node of the second viewing angle control transistor Tps may be electrically connected to the fourth connection node Nc4. The gate node of the second viewing angle control transistor Tps may receive the first scan signal Scan1.

The first control capacitor C1 may be electrically connected between a first connection node Nc1 and the fifth connection node Nc5. The first connection node Nc1 may be supplied with a control reference voltage Vcr. The fifth connection node Nc5 may be electrically connected to a gate node of the first emission control transistor Ts.

The second control capacitor C2 may be electrically connected between the first connection node Nc1 and the sixth connection node Nc6. The first connection node Nc1 may be supplied with the control reference voltage Vcr. The sixth connection node Nc6 may be electrically connected to the gate node of the second emission control transistor Tp.

The first viewing angle control circuit VCC1 may control the on and off operation of the first emission control transistor Ts and the second emission control transistor Tp.

Referring to FIG. 9, there is illustrated a case in which the first emission control transistor Ts is turned on and the second emission control transistor Tp is turned off. It will be described a control method for maintaining the first emission control transistor Ts in the turn-on state and the second emission control transistor Tp in the turn-off state as follows.

The first scan signal Scan1 for maintaining the first viewing angle control transistor Tss and the second viewing angle control transistor Tps in the turn-on state may be supplied to a gate node of the first viewing angle control transistor Tss and a gate node of the second viewing angle control transistor Tps.

After the first viewing angle control transistor Tss and the second viewing angle control transistor Tps are turned on, a low level signal may be supplied to the fifth connection node Nc5 through the first wide angle control line S1, a high level signal may be supplied to the sixth connection node Nc6 through the first narrow angle control line P1. In this case, the first connection node Nc1 may be supplied with the control reference voltage Vcr.

That is, a first control voltage corresponding to the voltage difference between the low level signal and the control reference voltage Vcr may be stored in the first control capacitor C1. In this case, a second control voltage corresponding to the voltage difference between the high level signal and the control reference voltage Ver may be stored in the second control capacitor C2.

The first control voltage may be supplied to the gate node of the first emission control transistor Ts, and accordingly, the first emission control transistor Ts may be turned on. In this case, the second control voltage may be supplied to the gate node of the second emission control transistor Tp, and accordingly, the second emission control transistor Tp may be turned off.

Since the first emission control transistor Ts is turned on and the second emission control transistor Tp is turned off, the first light emitting device ED_S may emit light. In the case that the first light emitting device ED_S emits light, the first subpixel SP1 may emit light while maintaining the wide angle WA.

Referring to FIG. 10, there is illustrated a case in which the first emission control transistor Ts is turned off and the second emission control transistor Tp is turned on. It will be described a control method for maintaining the first emission control transistor Ts in the turn-off state and the second emission control transistor Tp in the turn-on state as follows.

The first scan signal Scan1 for maintaining the first viewing angle control transistor Tss and the second viewing angle control transistor Tps in the turn-on state may be supplied to a gate node of the first viewing angle control transistor Tss and a gate node of the second viewing angle control transistor Tps.

After the first viewing angle control transistor Tss and the second viewing angle control transistor Tps are turned on, a high level signal may be supplied to the fifth connection node Nc5 through the first wide angle control line S1, and a low level signal may be supplied to the sixth connection node Nc6 through the first narrow angle control line P1. In this case, the first connection node Nc1 may be supplied with the control reference voltage Vcr.

That is, the second control voltage corresponding to the voltage difference between the high level signal and the control reference voltage Ver may be stored in the first control capacitor C1. In this case, the first control voltage corresponding to the voltage difference between the low level signal and the control reference voltage Ver may be stored in the second control capacitor C2.

The second control voltage may be supplied to the gate node of the first emission control transistor Ts, and accordingly, the first emission control transistor Ts may be turned off. In this case, the first control voltage may be supplied to the gate node of the second emission control transistor Tp, and accordingly, the second emission control transistor Tp may be turned on.

Since the first emission control transistor Ts is turned off and the second emission control transistor Tp is turned on, the second light emitting device ED_P may emit light. When the second light emitting device ED_P emits light, the first subpixel SP1 may emit light while maintaining the narrow angle NA.

The first subpixel SP1 may be designed in various ways, such as 2T1C, 3T1C, and 6T1C. Hereinafter, specific embodiments of the first subpixel SP1 will be described. The specific circuit structure for the first subpixel SP1 may be also applied to the remaining subpixels SP except for the first subpixel SP1.

Figure 11:
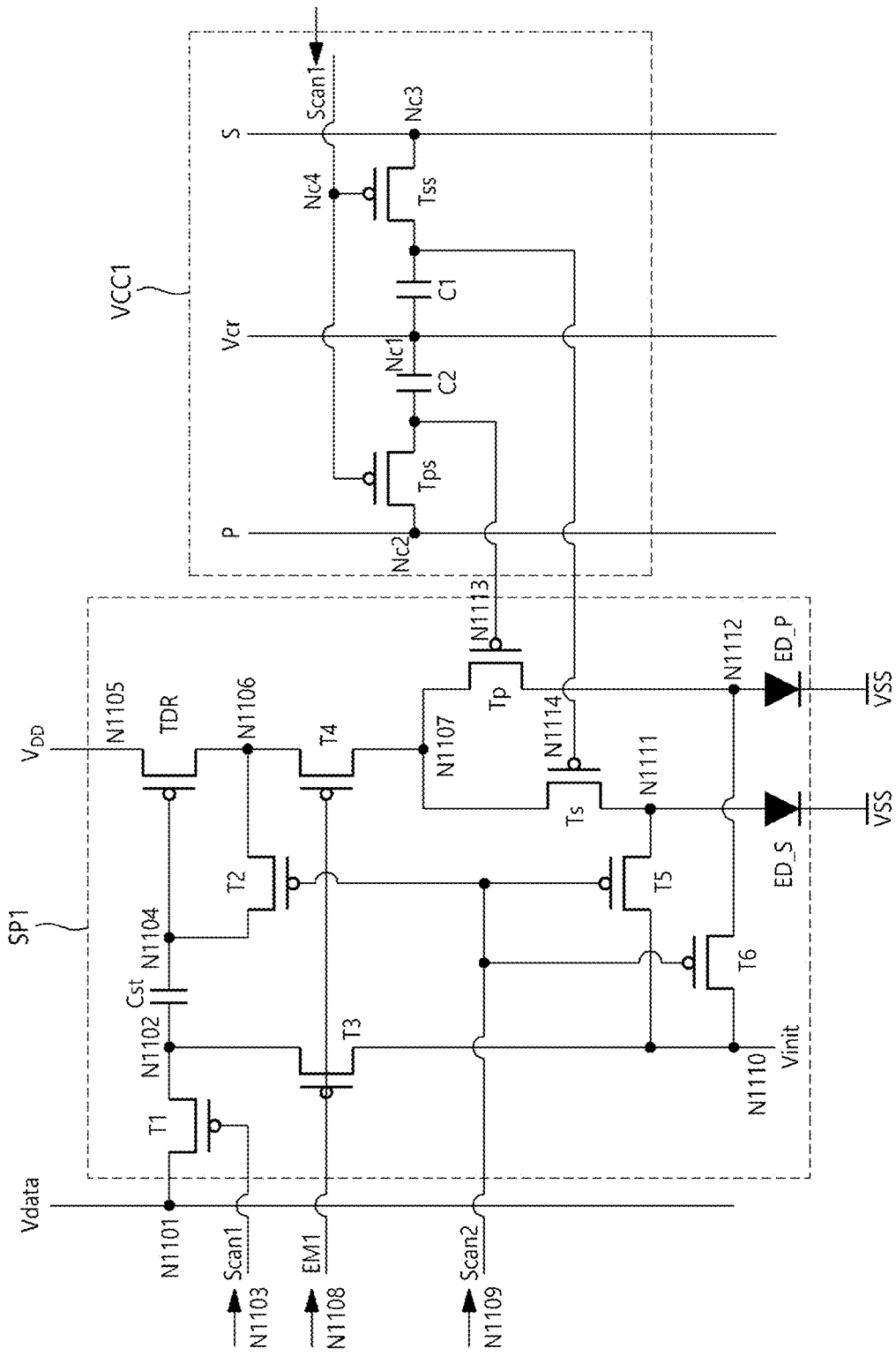
FIG. 11 is a diagram of a first subpixel and a first viewing angle control circuit according to one or more example embodiments of the present disclosure.

FIG. 11 illustrates a first subpixel SP1 and a first viewing angle control circuit VCC1 according to one or more example embodiments of the present disclosure.

Figure 12:
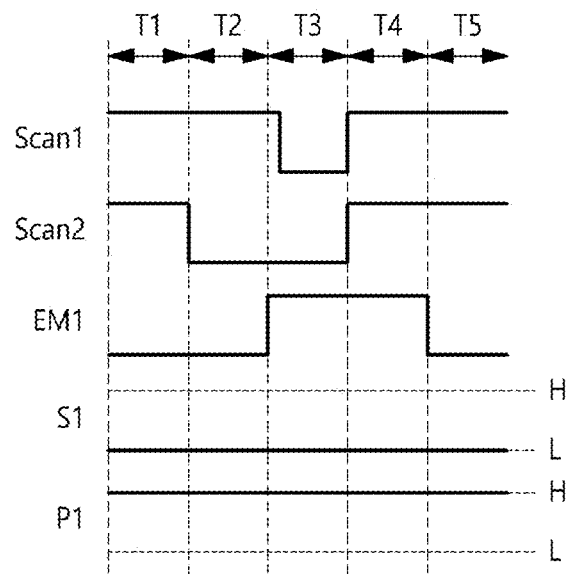
FIGS. 12 and 13 are operation timing diagrams of a first subpixel and a first viewing angle control circuit according to one or more example embodiments of the present disclosure.
Figure 13:
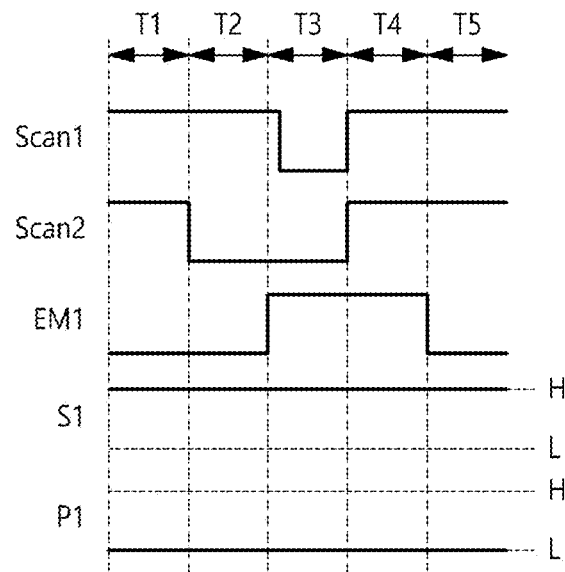

FIGS. 12 and 13 are operation timing diagrams of the first subpixel SP1 and the first viewing angle control circuit VCC1 according to one or more example embodiments of the present disclosure.

Referring to FIG. 11, the first viewing angle control circuit VCC1 may include a first viewing angle control transistor Tss, a second viewing angle control transistor Tps, a first control capacitor C1, and a second control capacitor C2. The first viewing angle control circuit VCC1 shown in FIG. 11 may be the same as the first viewing angle control circuit VCC1 shown in FIGS. 9 and 10.

The first subpixel SP1 may include a plurality of transistors, a storage capacitor Cst, and two light emitting devices ED_S and ED_P.

A first transistor T1 may be electrically connected between a first node N1101 and a second node N1102. A gate node of the first transistor T1 may be electrically connected to a third node N1103. The third node N1103 may receive first scan signal Scan1. The first node N1101 may be supplied with a data voltage Vdata. The first transistor T1 may be a P-type transistor.

A second transistor T2 may be electrically connected between a fourth node N1104 and a sixth node N1106. A gate node of the second transistor T2 may be electrically connected to a ninth node N1109. The ninth node N1109 may receive a first emission signal EM1. The second transistor T2 may be a P-type transistor.

A third transistor T3 may be electrically connected between the second node N1102 and a tenth node N1110. A gate node of the third transistor T3 may be electrically connected to an eighth node N1108. The eighth node N1108 may receive the first emission signal EM1. The tenth node N1110 may be supplied with an initialization voltage Vinit. The third transistor T3 may be a P-type transistor.

A fourth transistor T1 may be electrically connected between a sixth node N1106 and a seventh node N1107. A gate node of the fourth transistor T1 may be electrically connected to the eighth node N1108. The eighth node N1108 may receive the first emission signal EM1. The fourth transistor T1 may be a P-type transistor.

A fifth transistor T5 may be electrically connected between the tenth node N1110 and an eleventh node N1111. A gate node of the fifth transistor T5 may be electrically connected to a ninth node N1109. The ninth node N1109 can receive a second scan signal Scan2. The fifth transistor T5 may be a P-type transistor.

A sixth transistor T6 may be electrically connected between the tenth node N1110 and a twelfth node N1112. A gate node of the sixth transistor T6 may be electrically connected to a ninth node N1109. The ninth node N1109 may receive the second scan signal Scan2. The sixth transistor T6 may be a P-type transistor.

The driving transistor TDR may be electrically connected between the fifth node N1105 and the sixth node N1106. The fifth node N1105 may receive driving voltage VDD. The gate node of the driving transistor TDR may be electrically connected to the fourth node N1104. The driving transistor TDR may be a P-type transistor.

A storage capacitor Cst may be electrically connected between the second node N1102 and the fourth node N1104. The storage capacitor Cst may store a voltage corresponding to the difference between a voltage supplied to the second node N1102 and a voltage supplied to the fourth node N1104.

The first emission control transistor Ts may be electrically connected between the seventh node N1107 and the eleventh node N1111. The gate node of the first emission control transistor Ts may be electrically connected to a fourteenth node N1114. The first control capacitor C1 may be electrically connected between the fourteenth node N1114 and a first connection node Nc1. Therefore, the voltage stored in the first control capacitor C1 may be supplied to the fourteenth node N1114. The on-off state of the first emission control transistor Ts may be controlled according to the voltage stored in the first control capacitor C1. The first emission control transistor Ts may be a P-type transistor.

The first light emitting device ED_S may be electrically connected between the eleventh node N1111 and a node supplied with the base voltage VSS. When the first emission control transistor Ts is turned on, the first light emitting device ED_S may receive a driving current, and accordingly, the first light emitting device ED_S may emit light.

The second emission control transistor Tp may be electrically connected between the seventh node N1107 and the twelfth node N1112. The gate node of the second emission control transistor Tp may be electrically connected to the thirteenth node N1113. The second control capacitor C2 may be electrically connected between the thirteenth node N1113 and the first connection node Nc1. Therefore, the voltage stored in the second control capacitor C2 may be supplied to the thirteenth node N1113. Depending on the voltage stored in the second control capacitor C2, the on-off state of the second emission control transistor Tp may be controlled. The second emission control transistor Tp may be a P-type transistor.

The second light emitting device ED_P may be electrically connected between the twelfth node N1112 and a node supplied with the base voltage VSS. When the second emission control transistor Tp is turned on, the second light emitting device ED_P may receive a driving current, and the second light emitting device ED_P may emit light.

The first subpixel SP1 shown in FIG. 11 may have a subpixel structure in which internal compensation is performed. The circuit structure of the first subpixel SP1 has been described with reference to FIG. 11, and the operation of the first subpixel SP1 will be then described with reference to FIGS. 12 and 13.

Referring to FIGS. 12 and 13, the periods during which the first subpixel SP1 is driven may include a first period T1, a second period T2, a third period T3, a fourth period T4, and a fifth period T5.

The first scan signal Scan1 may be in a high level signal state in the first period T1, the second period T2, the fourth period T4, and the fifth period T5. The first scan signal Scan1 may be in a low level signal state in the third period T3. When the first scan signal Scan1 is a low level signal, the first transistor T1 may be turned on, and the data voltage Vdata may be supplied to the storage capacitor Cst.

The second scan signal Scan2 may be in a high level signal state in the first period T1, the fourth period T4, and the fifth period T5. The second scan signal Scan2 may be in a low level signal state in the second period T2 and the third period T3. When the second scan signal Scan2 is a low level signal, the initialization voltage Vinit may be supplied to the first subpixel SP1, and the driving voltage VDD may be supplied to the storage capacitor Cst.

The first emission signal EM1 may be in a low level signal state in the first period T1, the second period T2, and the fifth period T5. The first emission signal EM1 may be in a high level signal state in the third period T3 and the fourth period T4. When the first emission signal EM1 is in a low level signal state, the first subpixel SP1 may emit light through the light emitting device.

The period during which the subpixel SP emits light may include an initialization period and an emission period.

Referring to FIGS. 12 and 13, the initialization period may be the second period T2.

The initialization period may be a period in which the subpixel SP is initialized by supplying the initialization voltage Vinit to the subpixel SP. During the initialization period, the first scan signal Scan1 may be in a high level signal state, and the second scan signal Scan2 may be in a low level signal state. Additionally, during the initialization period, the first emission signal EM1 may be in a low level signal state.

Referring to FIGS. 12 and 13, the writing period may be the third period T3.

The writing period may be a period for storing the voltage for controlling the driving current flowing through the driving transistor TDR in the storage capacitor Cst. During the writing period, the first scan signal Scan1 may be in a low level signal state, and the second scan signal Scan2 may be in a low level signal state. Additionally, during the writing period, the first emission signal EM1 may be in a high level signal state.

Referring to FIGS. 12 and 13, the maintenance period may be the fourth period T4.

The maintenance period may be a period for controlling the light emission of the subpixel SP to operate stably. During the maintenance period, the first scan signal Scan1 may be in a high level signal state, and the second scan signal Scan2 may be in a high level signal state. Additionally, during the maintenance period, the first emission signal EM1 may be in a high level signal state.

Referring to FIGS. 12 and 13, the emission periods may be the first period T1 and the fifth period T5. The emission period occurring in the fifth period T5 may proceed later than the emission period occurring in the first period T1.

The emission period may be a period in which the light emitting device included in the subpixel SP emits light. During the emission period, the first scan signal Scan1 may be in a high level signal state, and the second scan signal Scan2 may be in a high level signal state. Additionally, during the emission period, the first emission signal EM1 may be in a low level signal state.

During the emission period, the driving current flowing through the driving transistor TDR may be supplied to the light emitting device. The light emitting device may emit light with a brightness corresponding to the driving current.

Depending on the signal supplied to the first wide angle control line S1 and the first narrow angle control line P1 during the emission period, the first subpixel SP1 may emit light at a wide angle or a narrow angle.

Referring to FIG. 12, a low level signal may be supplied to the first wide angle control line S1, and a high level signal may be supplied to the first narrow angle control line P1. Referring to FIG. 9, the first light emitting device ED_S emits light, and the first subpixel SP1 may emit light at a wide angle. That is, the area where the first subpixel SP1 is disposed may be the wide angle area SA.

Referring to FIG. 13, a high level signal may be supplied to the first wide angle control line S1, and a low level signal may be supplied to the first narrow angle control line P1. Referring to FIG. 10, the second light emitting device ED_P emits light, and the first subpixel SP1 may emit light at a narrow angle. That is, the area where the first subpixel SP1 is disposed may be a narrow angle area PA.

Figure 14:
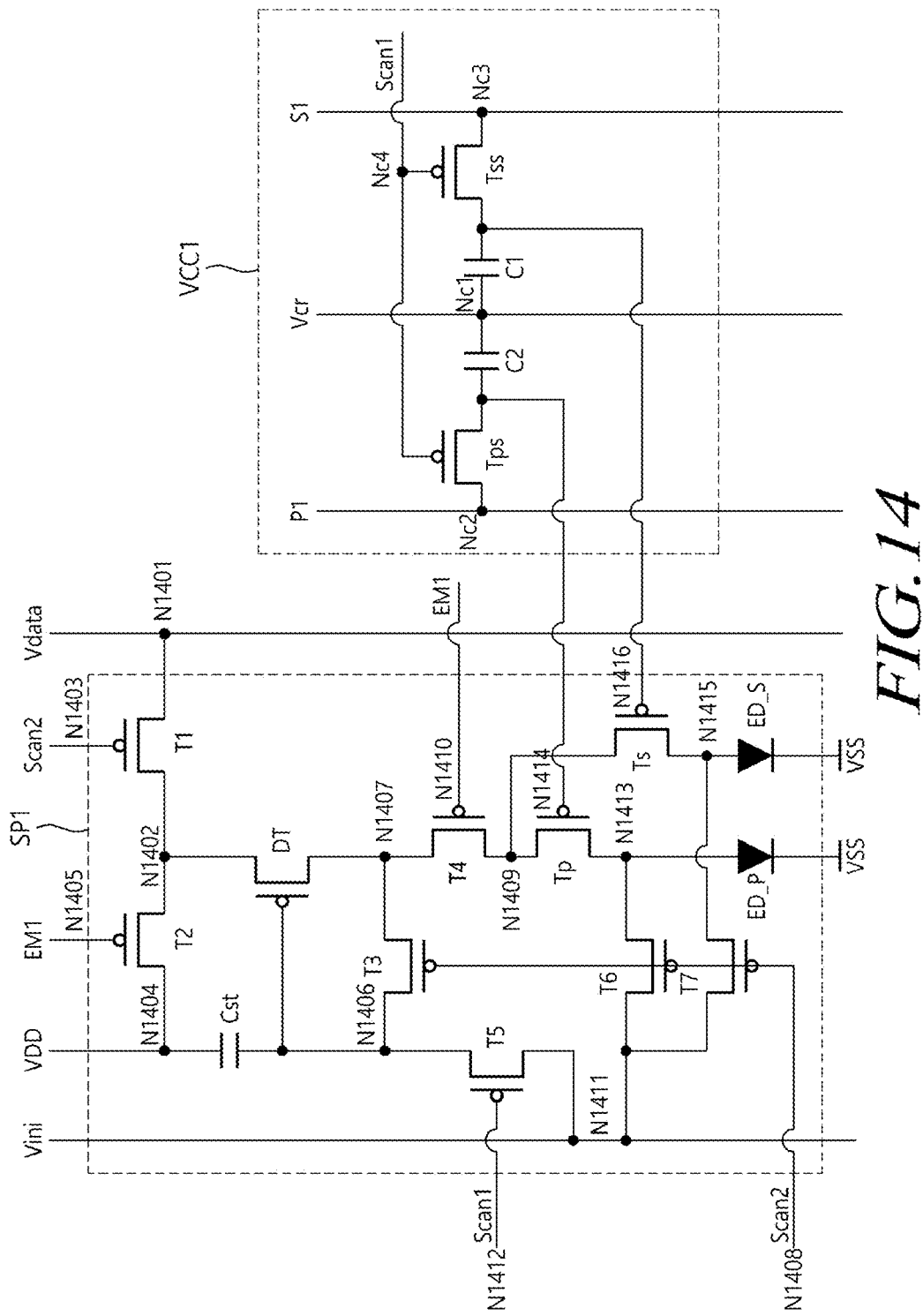
FIG. 14 is a diagram of a first subpixel and a first viewing angle control circuit according to one or more example embodiments of the present disclosure.

FIG. 14 illustrates a first subpixel SP1 and a first viewing angle control circuit VCC1 according to one or more example embodiments of the present disclosure.

Referring to FIG. 14, the first viewing angle control circuit VCC1 may include a first viewing angle control transistor Tss, a second viewing angle control transistor Tps, a first control capacitor C1, and a second control capacitor C2. The first viewing angle control circuit VCC1 shown in FIG. 14 may be the same as the first viewing angle control circuit VCC1 shown in FIGS. 9 and 10.

The first subpixel SP1 may include a plurality of transistors, a storage capacitor Cst, and two light emitting devices ED_S and ED_P.

A first transistor T1 may be electrically connected between a second node N1402 and a first node N1401. A gate node of the first transistor T1 may be electrically connected to a third node N1403. The third node N1403 may receive a second scan signal Scan2. The first node N1401 may be supplied with a data voltage Vdata. The first transistor T1 may be a P-type transistor.

A second transistor T2 may be electrically connected between a fourth node N1404 and the second node N1402. A driving voltage VDD may be supplied to the fourth node N1404. A gate node of the second transistor T2 may be electrically connected to a fifth node N1405. The fifth node N1405 may receive a first emission signal EM1. The second transistor T2 may be a P-type transistor.

A third transistor T3 may be electrically connected between a sixth node N1406 and a seventh node N1407. A gate node of the third transistor T3 may be electrically connected to an eighth node N1408. The eighth node N1408 may receive the second scan signal Scan2. The third transistor T3 may be a P-type transistor.

A fourth transistor T4 may be electrically connected between a seventh node N1407 and a ninth node N1409. A gate node of the fourth transistor T4 may be electrically connected to a tenth node N1410. The tenth node N1410 may receive the first emission signal EM1. The fourth transistor T4 may be a P-type transistor.

A fifth transistor T5 may be electrically connected between a sixth node N1406 and an eleventh node N1411. An initialization voltage Vini may be supplied to the eleventh node N1411. A gate node of the fifth transistor T5 may be electrically connected to a twelfth node N1412. The twelfth node N1412 may receive the first scan signal Scan1. The fifth transistor T5 may be a P-type transistor.

A sixth transistor T6 may be electrically connected between the eleventh node N1411 and a thirteenth node N1413. A gate node of the sixth transistor T6 may be electrically connected to the eighth node N1408. The eighth node N1408 may receive a second scan signal Scan2. The sixth transistor T6 may be a P-type transistor.

A seventh transistor T7 may be electrically connected between the eleventh node N1411 and the fifteenth node N1415. A gate node of the seventh transistor T7 may be electrically connected to the eighth node N1408. The eighth node N1408 may receive the second scan signal Scan2. The sixth transistor T6 may be a P-type transistor.

The driving transistor DT may be electrically connected between the second node N1402 and the seventh node N1407. The gate node of the driving transistor TDR may be electrically connected to the sixth node N1406. The driving transistor TDR may be a P-type transistor.

The storage capacitor Cst may be electrically connected between the fourth node N1404 and the sixth node N1406. The storage capacitor Cst may store a voltage corresponding to the difference between the voltage supplied to the fourth node N1404 and the voltage supplied to the sixth node N1406.

The first emission control transistor Ts may be electrically connected between the ninth node N1409 and the fifteenth node N1415. The gate node of the first emission control transistor Ts may be electrically connected to a sixteenth node N1416. The first control capacitor C1 may be electrically connected between the sixteenth node N1416 and a first connection node Nc1. Therefore, the voltage stored in the first control capacitor C1 may be supplied to the sixteenth node N1416. The on-off state of the first emission control transistor Ts may be controlled according to the voltage stored in the first control capacitor C1. The first emission control transistor Ts may be a P-type transistor.

The first light emitting device ED_S may be electrically connected between the fifteenth node N1415 and a node supplied with a base voltage VSS. When the first emission control transistor Ts is turned on, the first light emitting device ED_S may receive a driving current, and the first light emitting device ED_S may emit light.

The second emission control transistor Tp may be electrically connected between the ninth node N1409 and the thirteenth node N1413. The gate node of the second emission control transistor Tp may be electrically connected to the fourteenth node N1414. The second control capacitor C2 may be electrically connected between the fourteenth node N1414 and the first connection node Nc1. Therefore, the voltage stored in the second control capacitor C2 may be supplied to the fourteenth node N1414. Depending on the voltage stored in the second control capacitor C2, the on-off state of the second emission control transistor Tp may be controlled. The second emission control transistor Tp may be a P-type transistor.

The second light emitting device ED_P may be electrically connected between the fourteenth node N1414 and the node supplied with the base voltage VSS. When the second emission control transistor Tp is turned on, the second light emitting device ED_P may receive a driving current, and the second light emitting device ED_P may emit light.

Figure 15:
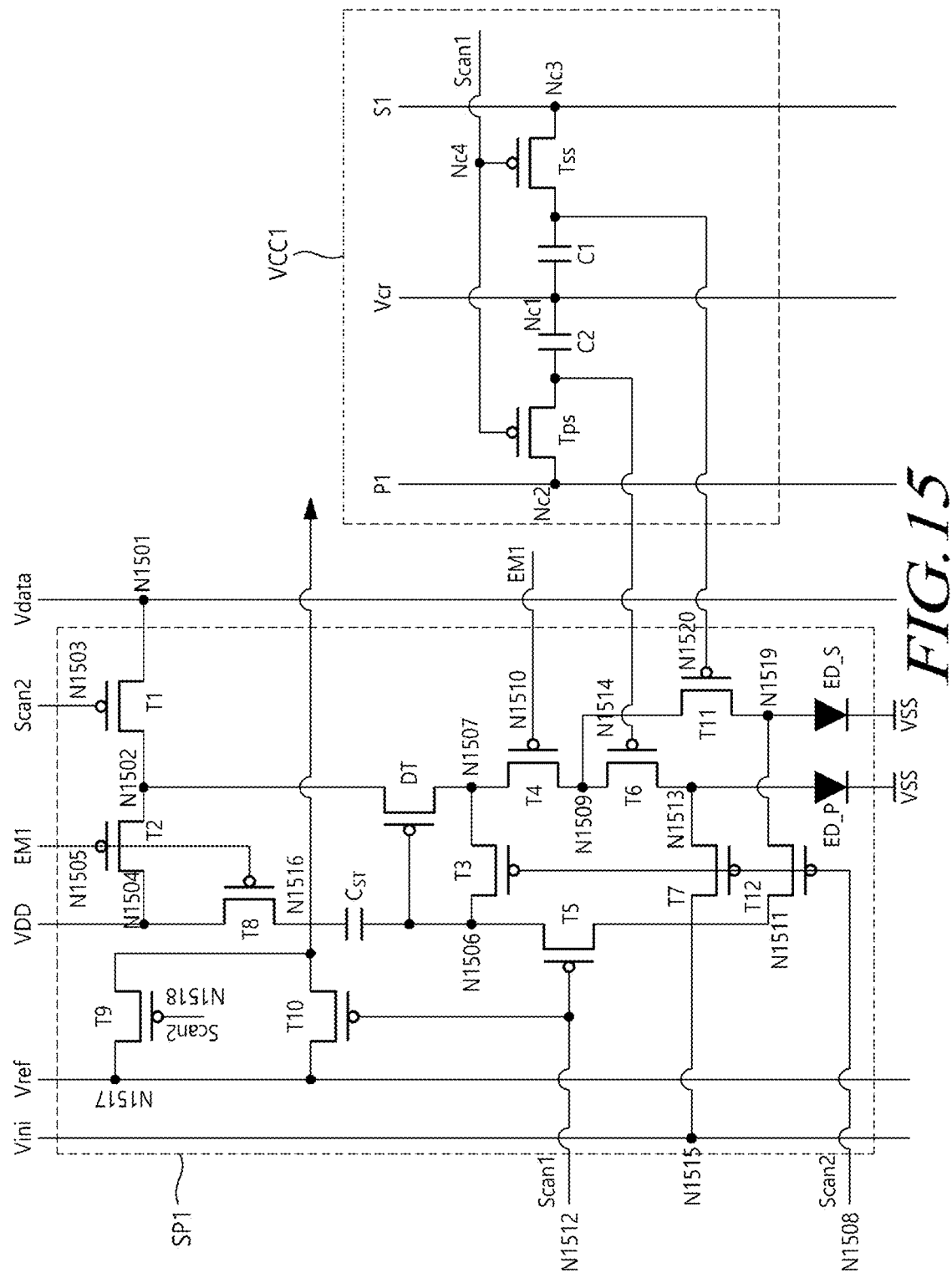
FIG. 15 is a diagram of a first subpixel and a first viewing angle control circuit according to one or more example embodiments of the present disclosure.

FIG. 15 illustrates a first subpixel SP1 and a first viewing angle control circuit VCC1 according to one or more example embodiments of the present disclosure.

Referring to FIG. 15, the first viewing angle control circuit VCC1 may include a first viewing angle control transistor Tss, a second viewing angle control transistor Tps, a first control capacitor C1, and a second control capacitor C2. The first viewing angle control circuit VCC1 shown in FIG. 15 may be the same as the first viewing angle control circuit VCC1 shown in FIGS. 9 and 10.

The first subpixel SP1 may include a plurality of transistors, a storage capacitor Cst, and two light emitting devices ED_S and ED_P.

A first transistor T1 may be electrically connected between a second node N1502 and a first node N1501. A gate node of the first transistor T1 may be electrically connected to a third node N1503. The third node N1503 may receive a second scan signal Scan2. The first node N1501 may be supplied with a data voltage Vdata. The first transistor T1 may be a P-type transistor.

A second transistor T2 may be electrically connected between a fourth node N1504 and the second node N1502. A gate node of the second transistor T2 may be electrically connected to a fifth node N1505. The fifth node N1505 may receive a first emission signal EM1. The second transistor T2 may be a P-type transistor.

A third transistor T3 may be electrically connected between a sixth node N1506 and a seventh node N1507. A gate node of the third transistor T3 may be electrically connected to an eighth node N1508. The eighth node N1508 may receive the second scan signal Scan2. The third transistor T3 may be a P-type transistor.

A fourth transistor T4 may be electrically connected between a seventh node N1507 and a ninth node N1509. A gate node of the fourth transistor T4 may be electrically connected to a tenth node N1510. The tenth node N1510 may receive the first emission signal EM1. The fourth transistor T4 may be a P-type transistor.

A fifth transistor T5 may be electrically connected between a sixth node N1506 and an eleventh node N1511. A gate node of the fifth transistor T5 may be electrically connected to a twelfth node N1512. The twelfth node N1512 may receive the first scan signal Scan1. The fifth transistor T5 may be a P-type transistor.

A seventh transistor T7 may be electrically connected between the eleventh node N1511 and a thirteenth node N1513. A gate node of the seventh transistor T7 may be electrically connected to the eighth node N1508. The eighth node N1508 may receive the second scan signal Scan2. The seventh transistor T7 may be a P-type transistor.

An eighth transistor T8 may be electrically connected between the fourth node N1504 and a sixteenth node N1516. A gate node of the eighth transistor T8 may be electrically connected to the fifth node N1505. The fifth node N1505 may receive the first emission signal EM1. The seventh transistor T7 may be a P-type transistor.

A ninth transistor T9 may be electrically connected between a sixteenth node N1516 and a seventeenth node N1517. The seventeenth node N1517 may receive a reference voltage Vref. A gate node of the ninth transistor T9 may be electrically connected to an eighteenth node N1518. The eighteenth node N1518 may receive the second scan signal Scan2. The ninth transistor T9 may be a P-type transistor.

A tenth transistor T10 may be electrically connected between the sixteenth node N1516 and the seventeenth node N1517. A gate node of the tenth transistor T10 may be electrically connected to the twelfth node N1512. The twelfth node N1512 may receive the first scan signal Scan1. The tenth transistor T10 may be a P-type transistor.

A twelfth transistor T12 may be electrically connected between the eleventh node N1511 and the fifteenth node N1515. The fifteenth node N1515 may receive an initialization voltage Vini. A gate node of the twelfth transistor T12 may be electrically connected to the eighth node N1508. The eighth node N1508 may receive the second scan signal Scan2. The twelfth transistor T12 may be a P-type transistor.

The driving transistor DT may be electrically connected between the second node N1502 and the seventh node N1507. The gate node of the driving transistor TDR may be electrically connected to the sixth node N1506. The driving transistor TDR may be a P-type transistor.

The storage capacitor Cst may be electrically connected between the fourth node N1504 and the sixth node N1506. The storage capacitor Cst may store a voltage corresponding to the difference between a voltage supplied to the fourth node N1504 and a voltage supplied to the sixth node N1506.

The first emission control transistor T11 may be electrically connected between the ninth node N1509 and a nineteenth node N1519. The first emission control transistor T11 may be the eleventh transistor T11. The gate node of the first emission control transistor T11 may be electrically connected to a 20th node N1520. The first control capacitor C1 may be electrically connected between the 20th node N1520 and a first connection node Nc1. Therefore, the voltage stored in the first control capacitor C1 may be supplied to the 20th node N1520. The on-off state of the first emission control transistor T11 may be controlled according to the voltage stored in the first control capacitor C1. The first emission control transistor T11 may be a P-type transistor.

The first light emitting device ED_S may be electrically connected between the nineteenth node N1519 and a node supplied with a base voltage VSS. When the first emission control transistor T11 is turned on, the first light emitting device ED_S may receive a driving current, and the first light emitting device ED_S may emit light.

The second emission control transistor T6 may be electrically connected between the ninth node N1509 and the thirteenth node N1513. The second emission control transistor T6 may be the sixth transistor T6. The gate node of the second emission control transistor T6 may be electrically connected to the fourteenth node N1514. The second control capacitor C2 may be electrically connected between the fourteenth node N1514 and a first connection node Nc1. Therefore, the voltage stored in the second control capacitor C2 may be supplied to the fourteenth node N1514. Depending on the voltage stored in the second control capacitor C2, the on-off state of the second emission control transistor T6 may be controlled. The second emission control transistor T6 may be a P-type transistor.

The second light emitting device ED_P may be electrically connected between the fourteenth node N1514 and the node supplied with the base voltage VSS. When the second emission control transistor T6 is turned on, the second light emitting device ED_P may receive a driving current, and the second light-emitting device ED_P may emit light.

Figure 16:
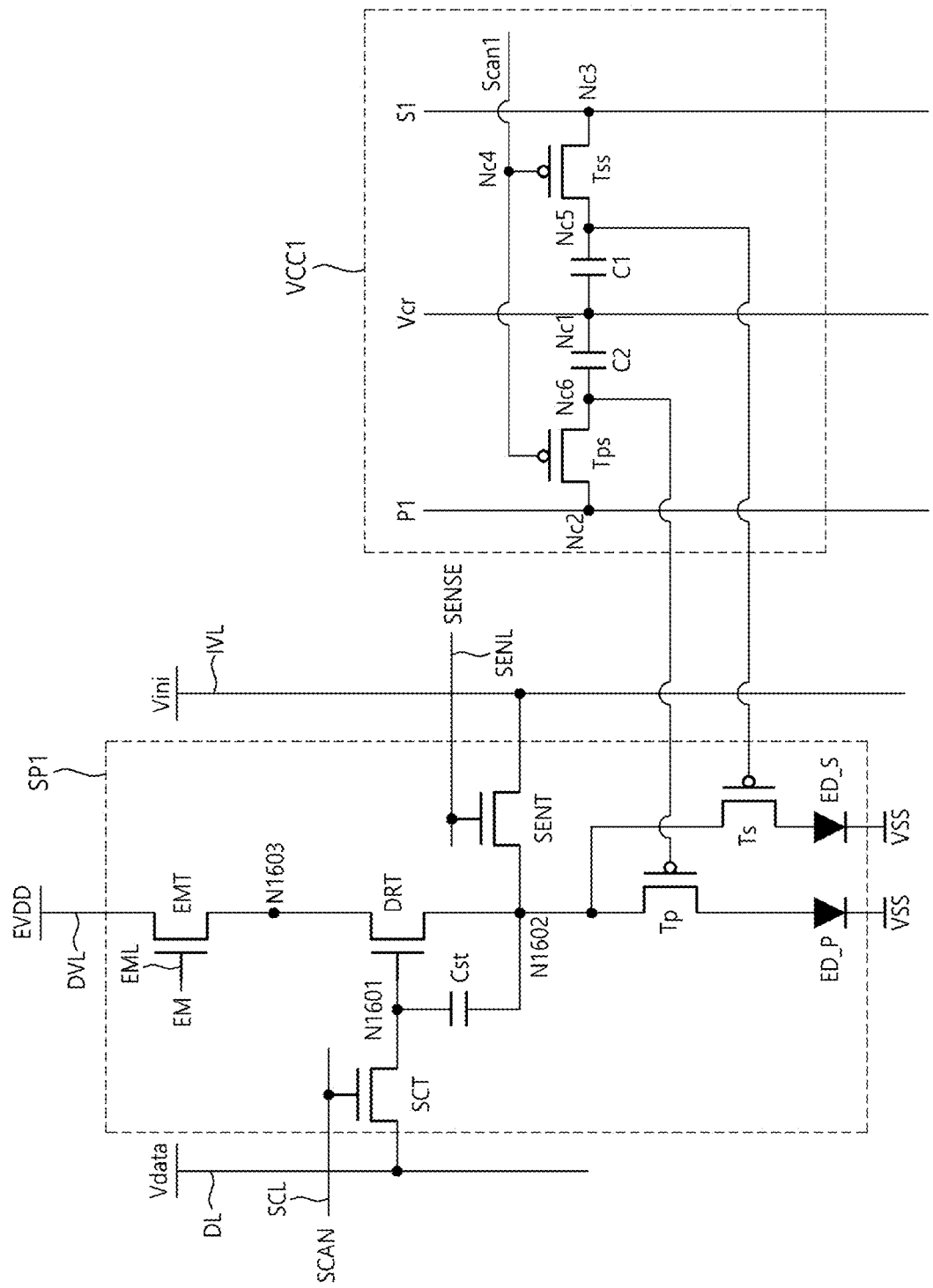
FIG. 16 is a diagram of a first subpixel and a first viewing angle control circuit according to one or more example embodiments of the present disclosure.

FIG. 16 illustrates a first subpixel SP1 and a first viewing angle control circuit VCC1 according to one or more example embodiments of the present disclosure.

Referring to FIG. 16, the first viewing angle control circuit VCC1 may include a first viewing angle control transistor Tss, a second viewing angle control transistor Tps, a first control capacitor C1, and a second control capacitor C2. The first viewing angle control circuit VCC1 shown in FIG. 16 may be the same as the first viewing angle control circuit VCC1 shown in FIGS. 9 and 10.

The first subpixel SP1 may include a plurality of transistors, a storage capacitor Cst, and two light emitting devices ED_S and ED_P.

A driving transistor DRT may be electrically connected between a second node N1602 and a third node N1603. A gate node of the driving transistor DRT may be electrically connected to a first node N1601.

The first node N1601 may be electrically connected to a source node or a drain node of a scan transistor SCT. The second node N1602 may be electrically connected to a first electrode E1 of the light emitting devices ED_P and ED_S. The third node N1603 may be electrically connected to a driving line DVL for supplying a driving voltage EVDD.

The scan transistor SCT may, in response to a scan signal SCAN supplied from the corresponding scan line SCL among the plurality of scan lines SCL, which are a type of gate line GL, control a connection between the first node N1601 of the driving transistor DRT and the corresponding data line DL among a plurality of data lines DL.

A drain node or a source node of the scan transistor SCT may be electrically connected to the corresponding data line DL. The source node or drain node of the scan transistor SCT may be electrically connected to the first node N1601. A gate node of the scan transistor SCT may be electrically connected to the scan line SCL, which is a type of gate line GL, and may receive a scan signal SCAN.

The scan transistor SCT may be turned on by the scan signal SCAN of the turn-on level voltage, and transfer the data voltage Vdata supplied from the corresponding data line DL to the first node N1601.

The scan transistor SCT may be turned on by the scan signal SCAN of a turn-on level voltage and turned off by the scan signal SCAN of a turn-off level voltage. Here, if the scan transistor SCT is n-type, the turn-on level voltage may be a high level voltage, and the turn-off level voltage may be a low level voltage. If the scan transistor SCT is a p-type, the turn-on level voltage may be a low level voltage and the turn-off level voltage may be a high level voltage.

A sense transistor SENT may control a connection between a second node N1602 and an initialization voltage line IVL, in response to a sense signal SENSE supplied from the corresponding sense line SENL among a plurality of sense lines SENL, which are a type of gate line GL.

A drain node or a source node of the sense transistor SENT may be electrically connected to the initialization voltage line IVL. The source node or drain node of the sense transistor SENT may be electrically connected to the second node N1602. A gate node of the sense transistor SENT may be electrically connected to a sense line SENL, which is a type of gate line GL, and may receive a sense signal SENSE.

The sense transistor SENT may be turned on and apply the initialization voltage Vini supplied from the initialization voltage line IVL to the second node N1602.

The sense transistor SENT may be turned on by the sense signal SENSE of a turn-on level voltage and turned off by the sense signal SENSE of a turn-off level voltage. Here, if the sense transistor SENT is n-type, the turn-on level voltage may be a high level voltage, and the turn-off level voltage may be a low level voltage. If the sense transistor SENT is a p-type, the turn-on level voltage may be a low level voltage and the turn-off level voltage may be a high level voltage.

In response to an emission signal EM supplied from the corresponding emission control line EML among the plurality of emission control lines EML, which are a type of gate line GL, an emission control transistor EMT may control a connection between a third node N1603 and the corresponding driving line DVL among the plurality of driving lines DVL. That is, as shown in FIG. 16, the emission control transistor EMT may be electrically connected between the third node N1603 and the driving line DVL.

A drain node or a source node of the emission control transistor EMT may be electrically connected to the driving line DVL. The source node or drain node of the emission control transistor EMT may be electrically connected to the third node N1603. The gate node of the emission control transistor EMT may be electrically connected to the emission control line EML, which is a type of gate line GL, and may receive the emission signal EM. The emission ratio of the light emitting devices ED_P and ED_S may be controlled according to a duty ratio of the emission signal EM supplied to the gate node of the emission control transistor EMT. The duty ratio may be adjusted by a pulse width modulation, etc.

Alternatively, the emission control transistor EMT may control the connection between the second node N1602 and the first electrode E1 of the light emitting devices ED_P and ED_S. That is, unlike shown in FIG. 16, the emission control transistor EMT may be electrically connected between the second node N1602 and the light emitting devices ED_P and ED_S.

The emission control transistor EMT may be turned on by an emission signal EM of a turn-on level voltage and turned off by an emission signal EM of a turn-off level voltage. Here, if the emission control transistor EMT is n-type, the turn-on level voltage may be a high level voltage, and the turn-off level voltage may be a low level voltage. If the emission control transistor EMT is a p-type, the turn-on level voltage may be a low level voltage and the turn-off level voltage may be a high level voltage.

A storage capacitor Cst may be electrically connected between the first node N1601 and the second node N1602, and may supply a data voltage Vdata corresponding to the image signal voltage or a voltage corresponding thereto for one frame time.

The storage capacitor Cst may be an external capacitor intentionally designed outside the driving transistor DRT rather than a parasitic capacitor (e.g., Cgs, Cgd), which is an internal capacitor existing between the first node N1601 and the second node N1602.

Each of the driving transistor DRT, the scan transistor SCT, the sense transistor SENT, and the emission control transistor EMT may be an n-type transistor or a p-type transistor. The driving transistor DRT, the scan transistor SCT, the sense transistor SENT, and the emission control transistor EMT may all be n-type transistors or p-type transistors. At least one of the driving transistor DRT, the scan transistor SCT, the sense transistor SENT, and the emission control transistor EMT may be an n-type transistor (or p-type transistor), and the others may be p-type transistors (or n-type transistors).

A 4TIC structure of the subpixel SP illustrated in FIG. 16 is only an example for explanation, and may further include one or more transistors or, depending on the case, one or more capacitors. Alternatively, each of the plurality of subpixels may have the same structure, or some of the plurality of subpixels may have a different structure.

The first emission control transistor Ts may be electrically connected between the second node N1602 and the first light emitting device ED_S. A gate node of the first emission control transistor Ts may be electrically connected to a fifth connection node Nc5. The first control capacitor C1 may be electrically connected between the fifth connection node Nc5 and a first connection node Nc1. Therefore, the voltage stored in the first control capacitor C1 may be supplied to the fifth connection node Nc5. The on-off state of the first emission control transistor Ts may be controlled according to the voltage stored in the first control capacitor C1. The first emission control transistor Ts may be a P-type transistor.

The first light emitting device ED_S may be electrically connected between the first emission control transistor Ts and the node supplied with the base voltage VSS. When the first emission control transistor Ts is turned on, the first light emitting device ED_S may receive a driving current, and the first light emitting device ED_S may emit light.

The second emission control transistor Tp may be electrically connected between the second node N1602 and the second light emitting device ED_P. A gate node of the second emission control transistor Tp may be electrically connected to a sixth connection node Nc6. The second control capacitor C2 may be electrically connected between the sixth connection node Nc6 and the first connection node Nc1. Therefore, the voltage stored in the second control capacitor C2 may be supplied to the sixth connection node Nc6. Depending on the voltage stored in the second control capacitor C2, the on-off state of the second emission control transistor Tp may be controlled. The second emission control transistor Tp may be a P-type transistor.

The second light emitting device ED_P may be electrically connected between the sixth connection node Nc6 and the node supplied with the base voltage VSS. When the second emission control transistor Tp is turned on, the second light emitting device ED_P may receive a driving current, and the second light emitting device ED_P may emit light.

Figure 17:
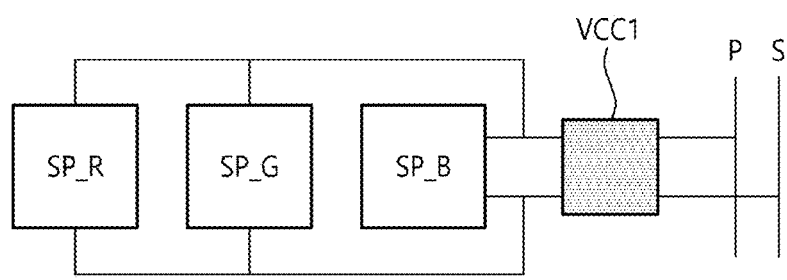
FIG. 17 is a diagram of a plurality of subpixels and a first viewing angle control circuit according to one or more example embodiments of the present disclosure.

FIG. 17 illustrates a plurality of subpixels SP and the first viewing angle control circuit VCC1 according to one or more example embodiments of the present disclosure.

Referring to FIG. 17, the first viewing angle control circuit VCC1 may be electrically connected to three subpixels SP_R, SP_G and SP_B. The three subpixels SP_R, SP_G and SP_B may be a red subpixel SP_R, a green subpixel SP_G, and a blue subpixel SP_B.

One pixel may be composed of a red subpixel SP_R, a green subpixel SP_G and a blue subpixel SP_B. However, this is for convenience of explanation, and one pixel may be composed of subpixels of, for example, RGB color, WRGB color, and CMY color.

The first viewing angle control circuit VCC1 may be electrically connected to each of the red subpixel SP_R, green subpixel SP_G and blue subpixel SP_B.

The first viewing angle control circuit VCC1 may be electrically connected to the narrow angle control line P and the wide angle control line S.

The first viewing angle control circuit VCC1 may control the viewing angle of one pixel by simultaneously controlling three subpixels SP_R, SP_G and SP_B.

That is, the viewing angle may be controlled in units of one pixel rather than in units of one subpixel.

According to the viewing angle control of the pixel through the first viewing angle control circuit VCC1, as shown in FIG. 7, the viewing angles in the left-right direction and the up-down direction may be controlled simultaneously. In FIG. 7, there is illustrated one narrow angle area PA, but depending on control, there may be two or more narrow angle areas PA.

The display device 100 may be applied to a television, a smartphone, a tablet PC, a vehicle, etc. In particular, when the display device 100 is a vehicle display device applied to a vehicle, a user sitting in a passenger seat rather than the driver's seat may control the narrow angle area PA so that the image close to the passenger seat is displayed only in the passenger seat. The passenger seat described above is an example, and the narrow angle area PA may be set in any area of the vehicle display device.

As described above, one or more example embodiments of the present disclosure may provide a display device capable of controlling the viewing angle of a specific area of the display panel.

One or more example embodiments of the present disclosure may provide a display device in which viewing angles in the left-right and up-down directions can be controlled simultaneously.

One or more example embodiments of the present disclosure may provide a display device capable of low power consumption through free viewing angle control.

Various examples and aspects of the present disclosure are described below. These are provided as examples, and do not limit the scope of the present disclosure.

A display device according to one or more example embodiments of the present disclosure may include a first viewing angle control circuit, a first narrow angle control line for being electrically connected to the first viewing angle control circuit, a first wide angle control line for being electrically connected to the first viewing angle control circuit and a first subpixel for being electrically connected to the first viewing angle control circuit.

The first subpixel may include a first light emitting device, a second light emitting device different from the first light emitting device, a driving transistor for driving the first light emitting device or the second light emitting device, a first emission control transistor for being electrically connected between the driving transistor and the first light emitting device, and a second emission control transistor for being electrically connected between the driving transistor and the second light emitting device.

The first viewing angle control circuit may include a first viewing angle control transistor for being electrically connected between the first narrow angle control line and a first control capacitor, and a second viewing angle control transistor for being electrically connected between the first wide angle control line and a second control capacitor. The first viewing angle control transistor may be for being electrically connected to a gate node of the first emission control transistor, and the second viewing angle control transistor may be for being electrically connected to a gate node of the second emission control transistor.

A low level signal may be supplied to the second control capacitor when a high level signal is supplied to the first control capacitor, and a low level signal may be supplied to the first control capacitor when a high level signal is supplied to the second control capacitor. In this regard, the display device may be configured to supply a low level signal to the second control capacitor when a high level signal is supplied to the first control capacitor. The high level signal for the first control capacitor may be higher than the low level signal for the second control capacitor. The display device may be configured to supply a low level signal to the first control capacitor when a high level signal is supplied to the second control capacitor. The high level signal for the second control capacitor may be higher than the low level signal for the first control capacitor.

The display device may be configured to supply a control reference voltage to a node shared by the first control capacitor and the second control capacitor.

The high level signal for the first control capacitor may be greater than the control reference voltage, and the low level signal for the second control capacitor may be less than the control reference voltage. The high level signal for the second control capacitor may be greater than the control reference voltage, and the low level signal for the first control capacitor may be less than the control reference voltage.

The second emission control transistor may be configured to be turned off when the first emission control transistor is turned on, and the first emission control transistor may be configured to be turned off when the second emission control transistor is turned on.

The first light emitting device may be configured to emit light when the first emission control transistor is turned on, and the second light emitting device may be configured to emit light when the second emission control transistor is turned on.

A viewing angle of the light emitted from the first light emitting device may be wider than a viewing angle of the light emitted from the second light emitting device. In this regard, the first light emitting device may be configured to emit light having a first viewing angle. The second light emitting device may be configured to emit light having a second viewing angle. The first viewing angle may be wider than the second viewing angle.

The first viewing angle control circuit may be for being electrically connected to the first subpixel, a second subpixel, and a third subpixel.

Each of the first subpixel, the second subpixel and the third subpixel may be configured to emit light having a same viewing angle.

The first narrow angle control line and the first wide angle control line may be for being electrically connected to a first pixel circuit and a second pixel circuit.

The first pixel circuit may include the first viewing angle control circuit and the first subpixel, and a viewing angle of light emitted from the first pixel circuit may be narrower than a viewing angle of light emitted from the second pixel circuit. In this regard, the first pixel circuit may be configured to emit light having a first viewing angle. The second pixel circuit may be configured to emit light having a second viewing angle. The first viewing angle may be narrower than the second viewing angle.

A second narrow angle control line and a second wide angle control line may be for being electrically connected to a third pixel circuit, and a viewing angle of light emitted from the first pixel circuit may be narrower than a viewing angle of light emitted from the third pixel circuit. In this regard, the first pixel circuit may be configured to emit light having a first viewing angle. The third pixel circuit may be configured to emit light having a second viewing angle. The first viewing angle may be narrower than the second viewing angle.

After the first viewing angle control circuit included in the first pixel circuit is controlled, a second viewing angle control circuit included in the second pixel circuit may be controlled. In this regard, the display device may be configured to control a second viewing angle control circuit included in the second pixel circuit after controlling the first viewing angle control circuit included in the first pixel circuit.

The first subpixel may be disposed in a first row, and a second subpixel different from the first subpixel may be disposed in a second row different from the first row. In addition, after a viewing angle of first row subpixels disposed in the first row is controlled, a viewing angle of second row subpixels disposed in the second row may be controlled. In this regard, the display device may be configured to control a viewing angle of the second subpixel disposed in the second row after controlling a viewing angle of the first subpixel disposed in the first row.

The first subpixel may include a first transistor for being electrically connected between a node to which a data voltage is for being supplied and a first electrode of a storage capacitor, a second transistor for being electrically connected to a second electrode of the storage capacitor and the driving transistor, a third transistor for being electrically connected between the first electrode and an initialization node to which an initialization voltage is for being supplied, a fourth transistor for being electrically connected to the driving transistor, a fifth transistor for being electrically connected between the initialization node and the first emission control transistor, and a sixth transistor for being electrically connected between the initialization node and the second emission control transistor.

A gate node of the first transistor may be supplied with a first scan signal, a gate node of the second transistor and a gate node of the fifth transistor may be supplied with a second scan signal, and a gate node of the third transistor and a gate node of the fourth transistor may be supplied with an emission signal. In this regard, the display device may be configured to supply: a first scan signal to a gate node of the first transistor; a second scan signal to a gate node of the second transistor and a gate node of the fifth transistor; and an emission signal to a gate node of the third transistor and a gate node of the fourth transistor.

A period during which the first subpixel is for being driven may include an initialization period during which the initialization voltage is for being supplied to the first subpixel, a writing period during which the data voltage is for being supplied to the storage capacitor, and an emission period during which the first light emitting device or the second light emitting device may be configured emit light.

In this regard, the display device may be configured to drive the first subpixel during a period. The period may include: an initialization period during which the display device may be configured to supply the initialization voltage to the first subpixel; a writing period during which the display device may be configured to supply the data voltage to the storage capacitor; and an emission period during which the first light emitting device or the second light emitting device may be configured to emit light.

A display panel according to one or more example embodiments of the present disclosure may include a first pixel circuit for being electrically connected to a first narrow angle control line and a first wide angle control line, a second pixel circuit for being electrically connected to the first narrow angle control line and the first wide angle control line, and a third pixel circuit for being electrically connected to a second narrow angle control line and a second wide angle control line. A viewing angle of light emitted from the second pixel circuit and the third pixel circuit may be a wide angle, and a viewing angle of light emitted from the first pixel circuit may be a narrow angle. In this regard, each of the second pixel circuit and the third pixel circuit may be configured to emit light having a wide viewing angle. The first pixel circuit may be configured to emit light having a narrow viewing angle. The wide viewing angle may be wider than the narrow viewing angle.

A display device according to one or more example embodiments of the present disclosure may include a first subpixel, and a first viewing angle control circuit connected to the first subpixel. The first subpixel may include a first light emitting device configured to emit light having a first viewing angle, and a second light emitting device configured to emit light having a second viewing angle that is different from the first viewing angle. The first viewing angle control circuit may be configured to selectively drive one of the first and second light emitting devices.

The display device may further include a second subpixel connected to the first viewing angle control circuit. The second subpixel may include a third light emitting device configured to emit light having a third viewing angle, and a fourth light emitting device configured to emit light having a fourth viewing angle that is different from the third viewing angle. The first viewing angle control circuit may be configured to selectively and simultaneously drive the one of the first and second light emitting devices and another one of the third and fourth light emitting devices.

The above description has been presented to enable any person skilled in the art to make, use and practice the technical features of the present disclosure, and has been provided in the context of one or more particular example applications and their example requirements. Various modifications, additions and substitutions to the described embodiments will be readily apparent to those skilled in the art, and the principles described herein may be applied to other embodiments and applications without departing from the scope of the present disclosure. The above description and the accompanying drawings provide examples of the technical features of the present disclosure for illustrative purposes. In other words, the disclosed embodiments are intended to illustrate the scope of the technical features of the present disclosure. Thus, the scope of the present disclosure is not limited to the embodiments shown, but is to be accorded the widest scope consistent with the claims. The scope of protection of the present disclosure should be construed based on the following claims, and all technical features within the scope of equivalents thereof should be construed as being included within the scope of the present disclosure.

What is claimed is:

1. A display device, comprising:
   a first viewing angle control circuit for being electrically connected to a first scan line;
   a first narrow angle control line for being electrically connected to the first viewing angle control circuit;
   a first wide angle control line for being electrically connected to the first viewing angle control circuit;
   a first subpixel for being electrically connected to the first viewing angle control circuit;
   a second viewing angle control circuit for being electrically connected to the first narrow angle control line, the first wide angle control line, and a second scan line; and
   a second subpixel for being electrically connected to the second viewing angle control circuit,
   wherein the first viewing angle control circuit is configured to receive a turn-on signal through the first scan line during a first driving period, and to control the first subpixel to emit light in a wide viewing angle mode or a narrow viewing angle mode during the first driving period, and
   wherein the second viewing angle control circuit is configured to receive a turn-on signal through the second scan line during a second driving period different from the first driving period, and to control the second subpixel to emit light in the wide viewing angle mode or the narrow viewing angle mode during the second driving period.

2. The display device of claim 1, wherein the first subpixel comprises:
   a first light emitting device;
   a second light emitting device different from the first light emitting device;
   a driving transistor for driving the first light emitting device or the second light emitting device;
   a first emission control transistor for being electrically connected between the driving transistor and the first light emitting device; and
   a second emission control transistor for being electrically connected between the driving transistor and the second light emitting device.

3. The display device of claim 2, wherein the first viewing angle control circuit comprises:
   a first viewing angle control transistor for being electrically connected between the first narrow angle control line and a first control capacitor; and
   a second viewing angle control transistor for being electrically connected between the first wide angle control line and a second control capacitor,
   wherein the first viewing angle control transistor is for being electrically connected to a gate node of the first emission control transistor, and the second viewing angle control transistor is for being electrically connected to a gate node of the second emission control transistor.

4. The display device of claim 3, wherein the display device is configured to supply a low level signal to the second control capacitor when a high level signal is supplied to the first control capacitor,
   wherein the high level signal for the first control capacitor is higher than the low level signal for the second control capacitor,
   wherein the display device is configured to supply a low level signal to the first control capacitor when a high level signal is supplied to the second control capacitor, and
   wherein the high level signal for the second control capacitor is higher than the low level signal for the first control capacitor.

5. The display device of claim 4, wherein the display device is configured to supply a control reference voltage to a node shared by the first control capacitor and the second control capacitor.

6. The display device of claim 5, wherein the high level signal for the first control capacitor is greater than the control reference voltage, and the low level signal for the second control capacitor is less than the control reference voltage, and
wherein the high level signal for the second control capacitor is greater than the control reference voltage, and the low level signal for the first control capacitor is less than the control reference voltage.

7. The display device of claim 2, wherein the second emission control transistor is configured to be turned off when the first emission control transistor is turned on, and
wherein the first emission control transistor is configured to be turned off when the second emission control transistor is turned on.

8. The display device of claim 7, wherein the first light emitting device is configured to emit light when the first emission control transistor is turned on, and the second light emitting device is configured to emit light when the second emission control transistor is turned on.

9. The display device of claim 2, wherein the first light emitting device is configured to emit light having a first viewing angle,
wherein the second light emitting device is configured to emit light having a second viewing angle, and
wherein the first viewing angle is wider than the second viewing angle.

10. The display device of claim 1, wherein the first viewing angle control circuit is for being electrically connected to the first subpixel, the second subpixel, and a third subpixel.

11. The display device of claim 10, wherein each of the first subpixel, the second subpixel and the third subpixel is configured to emit light having a same viewing angle.

12. The display device of claim 1, wherein the first narrow angle control line and the first wide angle control line are for being electrically connected to a first pixel circuit and a second pixel circuit.

13. The display device of claim 12, wherein the first pixel circuit includes the first viewing angle control circuit and the first subpixel,
wherein the first pixel circuit is configured to emit light having a first viewing angle,
wherein the second pixel circuit is configured to emit light having a second viewing angle, and
wherein the first viewing angle is narrower than the second viewing angle.

14. The display device of claim 12, wherein a second narrow angle control line and a second wide angle control line are for being electrically connected to a third pixel circuit,
wherein the first pixel circuit is configured to emit light having a first viewing angle,
wherein the third pixel circuit is configured to emit light having a second viewing angle, and
wherein the first viewing angle is narrower than the second viewing angle.

15. The display device of claim 12, wherein the display device is configured to control the second viewing angle control circuit included in the second pixel circuit after controlling the first viewing angle control circuit included in the first pixel circuit.

16. The display device of claim 1, wherein the first subpixel is disposed in a first row, and the second subpixel different from the first subpixel is disposed in a second row different from the first row, and
wherein the display device is configured to control a viewing angle of the second subpixel disposed in the second row after controlling a viewing angle of the first subpixel disposed in the first row.

17. The display device of claim 2, wherein the first subpixel comprises:
a first transistor for being electrically connected between a node to which a data voltage is for being supplied and a first electrode of a storage capacitor;
a second transistor for being electrically connected to a second electrode of the storage capacitor and the driving transistor;
a third transistor for being electrically connected between the first electrode and an initialization node to which an initialization voltage is for being supplied;
a fourth transistor for being electrically connected to the driving transistor;
a fifth transistor for being electrically connected between the initialization node and the first emission control transistor; and
a sixth transistor for being electrically connected between the initialization node and the second emission control transistor.

18. The display device of claim 17, wherein the display device is configured to supply:
a first scan signal to a gate node of the first transistor;
a second scan signal to a gate node of the second transistor and a gate node of the fifth transistor; and
an emission signal to a gate node of the third transistor and a gate node of the fourth transistor.

19. The display device of claim 18, wherein the display device is configured to drive the first subpixel during a period, and
wherein the period includes:
an initialization period during which the display device is configured to supply the initialization voltage to the first subpixel;
a writing period during which the display device is configured to supply the data voltage to the storage capacitor; and
an emission period during which the first light emitting device or the second light emitting device is configured to emit light.

20. A display panel, comprising:
a first pixel circuit;
a first viewing angle control circuit for being electrically connected to the first pixel circuit, a first narrow angle control line, a first wide angle control line, and a first scan line;
a second pixel circuit;
a second viewing angle control circuit for being electrically connected to the second pixel circuit, the first narrow angle control line, the first wide angle control line, and a second scan line; and
a third pixel circuit for being electrically connected to a second narrow angle control line and a second wide angle control line,
wherein each of the second pixel circuit and the third pixel circuit is configured to emit light having a wide viewing angle,
wherein the first pixel circuit is configured to emit light having a narrow viewing angle, and wherein the wide viewing angle is wider than the narrow viewing angle, wherein the first viewing angle control circuit is configured to receive a turn-on signal through the first scan line during a first driving period, and to control a first subpixel to emit light in a wide viewing angle mode or a narrow viewing angle mode during the first driving period, and wherein the second viewing angle control circuit is configured to receive a turn-on signal through the second scan line during a second driving period different from the first driving period, and to control a second subpixel to emit light in the wide viewing angle mode or the narrow viewing angle mode during the second driving period.

21. A display device, comprising:
a first subpixel;
a first viewing angle control circuit connected to the first subpixel, a first narrow angle control line, a first wide angle control line, and a first scan line;
a second pixel circuit; and
a second viewing angle control circuit electrically connected to the second pixel circuit, the first narrow angle control line, the first wide angle control line, and a second scan line,
wherein the first subpixel comprises:
a first light emitting device configured to emit light having a first viewing angle; and
a second light emitting device configured to emit light having a second viewing angle that is different from the first viewing angle, wherein the first viewing angle control circuit is configured to selectively drive one of the first and second light emitting devices, wherein the first viewing angle control circuit is configured to receive a turn-on signal through the first scan line during a first driving period, and to control the first subpixel to emit light in a wide viewing angle mode or a narrow viewing angle mode during the first driving period, and wherein the second viewing angle control circuit is configured to receive a turn-on signal through the second scan line during a second driving period different from the first driving period, and to control a second subpixel to emit light in the wide viewing angle mode or the narrow viewing angle mode during the second driving period.

22. The display device of claim 21, further comprising:
the second subpixel connected to the first viewing angle control circuit,
wherein the second subpixel comprises:
a third light emitting device configured to emit light having a third viewing angle; and
a fourth light emitting device configured to emit light having a fourth viewing angle that is different from the third viewing angle, and
wherein the first viewing angle control circuit is configured to selectively and simultaneously drive the one of the first and second light emitting devices and another one of the third and fourth light emitting devices.

* * * * *